United States Patent [19]

Menashi et al.

[11] Patent Number: 4,832,939
[45] Date of Patent: May 23, 1989

[54] BARIUM TITANATE BASED DIELECTRIC COMPOSITIONS

[75] Inventors: Jameel Menashi; Robert C. Reid, both of Lexington; Laurence P. Wagner, North Reading, all of Mass.

[73] Assignee: Cabot Corporation, Waltham, Mass.

[21] Appl. No.: 151,688

[22] Filed: Feb. 1, 1988

Related U.S. Application Data

[63] Continuation-in-part of Ser. No. 885,347, Jul. 14, 1986, abandoned.

[51] Int. Cl.$^4$ ............................................. C01G 23/04
[52] U.S. Cl. ..................................... 423/598; 423/71; 423/84; 423/265; 423/266; 423/274; 423/275; 423/608; 423/609; 423/610; 501/134; 501/136; 501/137; 501/138; 501/139; 502/525
[58] Field of Search .................. 423/598, 608, 71, 84, 423/265, 266, 275, 274, 609, 610; 501/134, 137, 136, 138, 139; 502/525

[56] References Cited

U.S. PATENT DOCUMENTS

| | | | |
|---|---|---|---|
| 2,218,655 | 10/1940 | Peterson | 423/598 |
| 2,841,503 | 7/1958 | Graham et al. | 423/598 |
| 3,490,927 | 1/1970 | Kahn et al. | 423/598 |
| 4,293,534 | 10/1981 | Arendt | 423/593 |
| 4,520,004 | 5/1985 | Uedaira et al. | 423/598 |
| 4,636,378 | 1/1987 | Pastor et al. | 423/598 |

FOREIGN PATENT DOCUMENTS

| | | | |
|---|---|---|---|
| 0141551 | 5/1985 | European Pat. Off. | 423/598 |
| 715762 | 9/1954 | United Kingdom | 423/598 |

OTHER PUBLICATIONS

Gallagher et al., "Preparation of Semi-Conducting Titanates by Chemical Methods", J. Amer. Ceramics Soc., 46, No. 8, 1963, pp. 359-365.

Primary Examiner—Robert L. Stoll
Assistant Examiner—Paige C. Harvey
Attorney, Agent, or Firm—Lawrence A. Chaletsky

[57] ABSTRACT

The present invention involves a method for producing a variety of barium titanate based powder products consisting of submicron, dispersible primary particles having narrow size distributions. The method, in its broadest aspects, involves heating an aqueous slurry of PbO, or Pb(OH)$_2$, and Ca(OH)$_2$ with a stoichiometric excess of the hydrous oxides of Ti(IV), Sn(IV), Zr(IV) and Hf(IV) to a temperature not exceeding 200° C. Thereafter, the resulting slurry temperature is adjusted to between 50° and 200° C. and a solution of Ba(OH)$_2$ and Sr(OH)$_2$, having a temperature of 70° to 100° C. is added within a period of five minutes or less to the slurry. About 10 minutes after the addition of the Ba(OH)$_2$ and Sr(OH)$_2$ solution is completed, the slurry is heated to a temperature not exceeding 225° C. to ensure formation of a stoichiometric perovskite product. Thereafter, the slurry is cooled and the solid product is recovered.

10 Claims, 1 Drawing Sheet

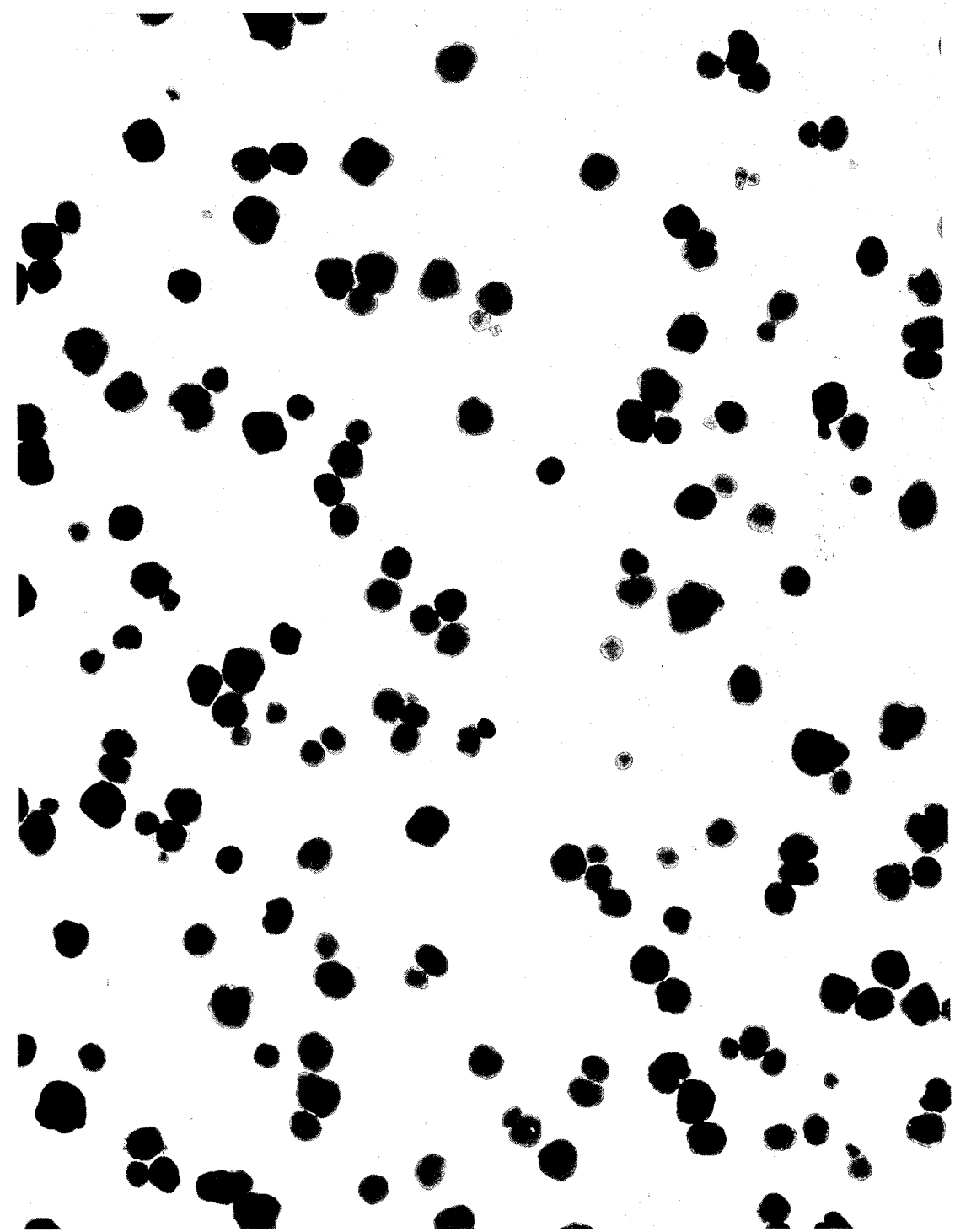

BARIUM TITANATE BASED DIELECTRIC
COMPOSITIONS

This application is a continuation-in-part of application Ser. No. 885,347, filed July 14, 1986, now abandoned.

FIELD OF ART

This invention relates to a method of producing barium titanate and barium titanate based dielectric compositions and, more particularly, relates to a method of hydrothermally synthesizing dispersible, submicron barium titanate and barium titanate compositions which have very narrow particle size distributions.

BACKGROUND OF THE ART

The high dielectric constant of barium titanate makes it an especially desirable material from which capacitors, condensers, and other electronic components can be fabricated. Especially attractive is the fact that barium titanate's electrical properties can be controlled within a wide range by means of mixed crystal formation and doping.

The very simple cubic perovskite structure exhibited by barium titanate is the high temperature crystal form for many mixed oxides of the $ABO_3$ type. This crystal structure consists of a regular array of corner-sharing oxygen octahedra with smaller titanium(IV) cations occupying the central octahedral B site and barium(II) cations filling the interstices between octahedra in the larger 12-coordinated A-sites. This crystal structure is of particular significance since it is amenable to a plethora of multiple cation substitutions at both the A and B sites so that many more complex ferroelectric compounds can be easily produced.

Barium titanate's relatively simple lattice structure is characterized by the $TiO_6$-octahedra which because of their high polarizability essentially determine the dielectric properties of the structure. The high polarizability is due to the fact that the small Ti(IV) ions have relatively more space within the oxygen octahedra. This cubic unit cell, however, is stable only above the Curie point temperature of about 130° C. Below 130° C., the Ti(IV) ions occupy off-center positions. This transition to the off-center position results in a change in crystal structure from cubic to tetragonal between temperatures of 5° C. and 130° C., to orthorhombic between −90° C. and 5° C. and finally to rhombohedral at temperatures less than −90° C. Needless to say, the dielectric constant and strength also decreases relative to these temperature and crystal structure changes.

Because the dielectric constant of barium titanate ceramic has a strong temperature dependence and exhibits a pronounced, maximum dielectric constant at or around the Curie point, pure $BaTiO_3$ is rarely used in the production of commercial dielectric compositions. Hence, in practice, additives are employed to upgrade the dielectric properties of barium titanate. For example, it is known in the art that the Curie temperature can be shifted to lower temeratures and broadened by effecting a partial substitution of strontium and/or calcium for barium and of zirconium and/or tin for titanium, thereby resulting in materials with a maximum dielectric constant of 10,000 to 15,000 at room temperature. Alternatively, the Curie temperature can be increased by a partial substitution of lead(II) for barium. Additionally, small amounts of other metallic ions of suitable size but with valencies which are different to those of barium and titanium, as summarized in B. Jaffee, W. R. Cook, Jr. and H. Jaffe, "Piezoelectric Ceramics", Academic Press, N.Y. 1971, can cause profound changes in the nature of the dielectric properties.

In commerical practice, barium titanate based dielectric powders are produced either by blending the required pure titanates, zirconates, stannates and dopants or by directly producing the desired dielectric powder by a high temperature solid state reaction of an intimate mixture of the appropriate stoichiometric amounts of the oxides or oxide precursors (e.g., carbonates, hydroxides or nitrates) of barium, calcium, titanium, etc. The pure titanates, zirconates, stannates, etc. are also, typically, produced by a high temperature solid phase reaction process. In such calcination processes the required reactants are wet milled to accomplish the formation of an intimate mixture. The resulting slurry is dried and calcined at elevated temperatures, ranging from about 700° to 1200° C., to attain the desired solid state reactions. Thereafter, the calcine is remilled to produce a dispersible powder for use in making green bodies.

The processes for producing barium titanate by solid phase reactions are relatively simple; nevertheless, they do suffer from several disadvantages. Firstly, the milling steps serve as a source of contaminants which can adversely affect electrical properties. Compositional inhomogenieties on a microscale can lead to the formation of undesirable phases such as barium orthotitanate, $Ba_2TiO_4$, which can give rise to moisture sensitive properties. Secondly, during calcination, substantial particle growth and interparticle sintering occur. As a consequence, the milled product consists of irregularly shaped fractured aggregates which have a wide size distribution ranging from about 0.2 up to 10 microns. Moreover, published studies have shown that green bodies formed from such aggregated powders with broad aggregate size distributions require elevated sintering temperatures and give sintered bodies with a broad grain size distribution. Hence, as pointed out by E. A. Barringer et al. in U.S. Pat. No. 4,543,341, there exists a need for better methods for making oxide powders.

Many approaches have been developed to try to overcome the limitations of the conventional solid state reaction processes employed to produce barium titanate. These methods include the thermal decomposition of barium titanyl oxalate and barium titanyl citrate and the high temperature oxidation of atomized solutions of either barium and titanium alcoholates dissolved in alcohol or barium and titanium lactates dissolved in water. In addition, barium titatate has been produced from molten salts, by hydrolysis of barium and titanium alkoxides dissolved in alcohol and by the reaction of barium hydroxide with titania both hydrothermally and in aqueous media.

Since the barium titanate products produced by some of these processes have been shown to have morphologies approaching those desired here attempts have been made to extend these same methods to the production of barium titanate based compositions or coforms. For example, B. J. Mulder discloses in an article entitled "Preparation of BaTiO3 and Other Ceramic Powders by Coprecipitation of Citrates in an Alcohol", Ceramic Bulletin, 49, No. 11, 1970, pages 990–993, that $BaTiO_3$ based compositions or coforms can be prepared by a coprecipitation process. In this process aqueous solutions of Ti(IV), Zr(IV) and/or Sn(IV) citrates and formates of Ba(II), Mg(II), Ca(II), Sr(II) and/or Pb(II) are sprayed into alcohol to effect coprecipitation. The precipitates are decomposed by calcination in a stream of air diluted with $N_2$ at 700°–800° C. to give globular and rod shaped particles having an average size of 3 to 10 microns.

Barium titanate based coforms have been prepared by precipitation and subsequent calcination of mixed divalent alkaline earth metal and/or Pb(II) titanyl and/or zirconyl oxalates as disclosed by Gallagher et al. in an article entitled "Preparation of Semi-Conducting Titanates by Chemical Methods", J. Amer. Ceramic Soc., 46, No. 8, 1963 pages 359-365. These workers demonstrated that $BaTiO_3$ based compositions in which Ba is replaced by Sr or Pb in the range of 0 to 50 mole percent or in which Ti(IV) is replaced by Zr(IV) in the range of 0 to 20 mole percent may be produced.

Faxon et al. discloses in U.S. Pat. No. 3,637,531 that $BaTiO_3$ based coforms can be synthesized by heating a solution of a titanium chelate or a titanium alkoxide, an alkaline earth salt and a lanthanide salt to form a semi-solid mass. The mass is then calcined to produce the desired titanate coform.

In each of the prior art references cited above, however, calcination is employed to synthesize the particles of the barium titanate based coforms. For reasons already noted, this elevated temperature operation produces aggregated products which after comminution give smaller aggregate fragments with wide size distributions.

The prior art has also attempted to circumvent the disadvantages of conventionally prepared $BaTiO_3$ powders by synthesizing a mixed alkaline earth titanate-zirconate composition through a molten salt reaction. Such a process is disclosed in U.S. Pat. No. 4,293,534 to Arendt. In the practice of this process titania or zirconia or mixtures thereof and barium oxide, strontium oxide or mixtures thereof are mixed with alkali metal hydroxides and heated to temperatures sufficient to melt the hydroxide solvent. The reactants dissolve in the molten solvent and precipitate as an alkaline earth titanate, zirconate or a solid solution having the general formula $Ba_xSr_{(1-x)}Ti_yZr_{(1-y)}O_3$. The products are characterized as chemically homogeneous, relatively monodisperse, submicron crystallites.

It is apparent that the morphologies of the products formed by the use of the molten salt synthesis process are within the scope of this invention. However, the method is limited in that it can only produce Sr and/or Zr containing coforms.

Hydrothermal processes have also been described in which coforms are produced. Balduzzi and Steinemann in British Pat. No. 715,762 heated aqueous slurries of hydrated $TiO_2$ with stoichiometric amounts of alkaline earth hydroxides to temperatures between 200° C. and 400° C. to form mixed alkaline earth titanates. Although it was stated that products of any desired size up to about 100 microns could be produced, it is doubtful that, other than in the case of Sr-containing coforms, products with the morphological characteristics of this invention could be obtained. This contention is based on the finding that hydrothermal treatment of stoichiometric amounts of $Ca(OH)_2$ and $Ba(OH)_2$ with hydrous titania by heating to elevated temperatures would first result in the formation of $BaTiO_3$ followed by that of $CaTiO_3$. Unless the $CaTiO_3$ formed nucleates on the $BaTiO_3$ surface, it is doubtful whether products with the desired morphologies would be obtained. Further, it has been found that a hydrothermal treatment of a slurry of MgO and hydrous $TiO_2$ by heating to 300° C. did not result in the formation of significant amounts of $MgTiO_3$. X-ray diffraction data indicated that the major products of the reaction were $Mg(OH)_2$ and $TiO_2$. This finding indicates that treatment of $TiO_2$ with a stoichiometric amount of $Mg(OH)_2$ and $Ba(OH)_2$ by heating to elevated temperatures would give a mixture of $Mg(OH)_2$, $TiO_2$ and $BaTiO_3$.

Matsushita et al. in European patent publication No. 014551 demonstrated that dilute slurries of hydrous titania can be reacted with $Ba(OH)_2$ and/or $Sr(OH)_2$ by heating to temperatures up to 110° C. to produce either $BaTiO_3$ or Sr-containing coforms. The morphological characteristics of these coforms appear to be comparable with those of this invention. The method, however, is again limited to producing only Sr-containing coforms.

A publication of the Sakai Chemical Industry Company entitled "Easily Sinterable $BaTiO_3$ Powder", by Abe et al. discloses a hydrothermal process for synthesizing a barium titanate based coform with the formula $BaTi_{(1-x)}Sn_xO_3$. In this process a 0.6M $Ti_{(1-x)}Sn_xO_2$ slurry, prepared by neutralizing an aqueous solution of $SnOCl_2$ and $TiCl_4$, is mixed with 0.9M $Ba(OH)_2$ and subjected to a hydrothermal treatment at 200° C. for at least five hours. Although not explicitly delineated, Abe et al. imply the slurry was heated to temperature.

Acetic acid is added to the resultant slurry in order to adjust the pH to seven and a washed product having a Ba/Ti mole ratio of 0.99 was recovered. To compensate for the Ba deficiency, barium oxalate was added to the product. Although no description of the coform morphology was indicated, the $BaTiO_3$ product produced by the same process had a surface area of 11 $m^2/g$, a particle size of 0.1 micron and appeared to be dispersible. Presumably the Sn-containing coforms have comparable morphologies and are thus comparable with those of this invention. However, Abe et al. is limited in that it teaches only that Sn(IV) can be synthesized into a barium titanate coform. Perhaps, by analogy, it does suggest the use of other tetravalent cations such as Zr(IV) and possibly the use of divalent Sr(II), since, like $Ba(OH)_2$, $Sr(OH)_2$ is quite soluble in aqueous media. However, the process of Abe et al. cannot be used for substitution of divalent Curie point shifters such as Pb and Ca for the divalent Ba. Moreover, none of these prior art hydrothermal processes teaches how product particle size can be varied by manipulation of the process variables. Also, none of the prior art hydrothermal references provides for a single general method for producing a large variety of multi-component coforms which have the morphologies of this invention.

SUMMARY OF THE INVENTION

The present invention is a method of hydrothermally synthesizing stoichiometric, submicron, dispersible doped and undoped barium titanate and dielectric compositions of barium titanate which have very narrow particle size distributions. In one important embodiment of the invention, barium titanate powder is produced by introducing a solution of 0.5 to 1.0 molar $Ba(OH)_2$ heated to a temperature between 70°–110° C., preferably 70°–90° C., into a vigorously stirred slurry of a high surface area hydrous titania at a temperature ranging between 60° C. and 150° C. at a constant rate over a time period of less than five minutes. The $Ba(OH)_2$ introduction process continues until the Ba/Ti mole ratio in the slurry is between 1.1 to 1.3. The slurry is then held at temperature for 10 to 30 minutes so that 95 to 98 percent of the TiO₂ is converted to BaTiO₃. The slurry is then heated to an elevated temperature, preferably at least 175° C., to ensure complete conversion of the tetravalent hydrous oxide to a stoichiometric perovskite. After cooling to an appropriate temperature, the slurry is pressure filtered to give a cake of stoichiometric BaTiO₃ containing 80 to 85 weight percent solids. The product is then washed with either water or a 0.01 to 0.02M Ba(OH)₂ solution. The wet cake is then dried resulting in a high purity, stoichiometric barium titanate powder having a primary particle size in the range between 0.05 and 0.4 micron with a very narrow particle size distribution.

In another important embodiment of the invention, various submicron, dispersible barium titanate based coforms are produced hydrothermally in which the divalent barium of the barium titanate is partially replaced by one or more divalent cations and/or the tetravalent titanium is partially replaced by one or more tetravalent cations. In the embodiments where the coforms do not contain either Pb(II) or Ca(II) a heated solution of Ba(OH)₂ containing the requisite amount of Sr(OH)₂ is added to a vigorously stirred slurry of the hydrous oxides of TiO₂ and/or SnO₂, ZrO₂ and HfO₂ in a fixed time interval at a range of temperatures between 60° and 200° C. The slurry is then heated to an elevated temperature so that any remaining unreacted hydrous oxides combine with the soluble divalent cation hydroxides.

In cases where it is desired that the coforms contain Pb(II) and/or Ca(II), the oxide or hydroxide of Pb and/or Ca(OH)₂ are first hydrothermally treated with a stoichiometric excess of the tetravalent cations at temperatures up to 200° C. In this treatment, PbO or Pb(OH)₂ or Ca(OH)₂, which, unlike Sr(OH)₂ or Ba(OH)₂, are relatively insoluble in aqueous media at temperatures up to 200° C., combine with the tetravalent hydrous oxides to form perovskites. Since the molar ratio of the relatively insoluble divalent cation oxides or hydroxides to tetravalent hydrous oxides is less than 0.4 and, preferably less than 0.3, after perovskite formation substantial amounts of unreacted hydrous oxides remain.

The slurry is adjusted to a temperature between 60° C. and 150° C. and then a heated solution containing the requisite concentrations of Ba(OH)₂ and Sr(OH)₂ is introduced at a constant rate over a specified time period. The resulting slurry is held at temperature for 10 to 30 minutes and then, if necessary, heated to an elevated temperature to ensure complete conversion of the tetravalent hydrous oxides to stoichiometric perovskites. Because the CaTiO₃ and PbTiO₃ perovskites can undergo displacement in the presence of excess Ba(OH)₂, the stoichiometric excess of Ba(OH)₂ employed and the final temperature to which the slurry is heated are carefully controlled.

In another important embodiment of the invention, both barium titanate and the barium titanate based coforms are uniformly doped in the hydrothermal synthesis process with small amounts of one or more of a variety of dopants. Typical dopants are those described in the literature and include niobium(V), lanthanum(III), yttrium(III), nickel(II), manganese(II), iron(III) and cobalt(II).

The doped products are produced by addition of the requisite amounts of the dopant or dopants, either as a high surface area hydrous oxide wet cake or as a solution of their soluble salts, to the tetravalent hydrous oxide slurry prior to initiation of the synthesis process. The soluble dopant salts employed are those having anions, such as nitrates, formates and acetates, which can be eliminated during a subsequent sintering operation either by decomposition or by oxidation. Thereafter, the slurry is treated in an analogous manner to those employed in the synthesis of either barium titanate or one of the various coforms.

Accordingly, it is a primary object of the present invention to provide a method of producing unaggregated, dispersible, stoichiometric, submicron doped and undoped barium titanate and barium titanate based dielectric compositions having a very narrow particle size distribution.

It is another object of the present invention to provide a method of producing unaggregated, dispersible, submicron, stoichiometric doped and undoped barium titanate based dielectric compositions in which partial replacement of the divalent barium cation and tetravalent titanium cation is easily accomplished.

It is another object of the present invention to provide a method of producing a wide variety of compositions of unaggregated, dispersible, submicron, stoichiometric barium titanate based dielectric coforms.

It is another object of the present invention to provide a method in which the primary particle size of the doped and undoped barium titanate and barium titanate based dielectric composition is controllable.

It is a still further object of the present invention to provide a simple and inexpensive method for producing unaggregated, dispersible, submicron, stoichiometric barium titanate, doped barium titanate, barium titanate based coforms, and doped barium titanate based coforms with very narrow particle size distributions.

BRIEF DESCRIPTION OF THE DRAWING

The FIGURE is a transmission electron micrograph of the product produced by example 5.

DESCRIPTION OF THE PREFERRED EMBODIMENT

At the outset, the invention is described in its broadest overall aspects, with a more detailed description following. The present invention is a method of producing stoichiometric, unaggregated, dispersible, submicron doped and undoped barium titanate powder and doped and undoped coforms of barium titanate powder which have a very narrow particle size distribution. The preferred barium titanate powder and coforms of barium titanate powder have the general formula:

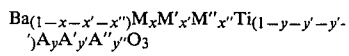

where M equals Pb(II), M' equals Ca(II), M" equals Sr(II), A equals Sn(IV), A' equals Zr(IV) and A" equals Hf(IV), x, x', x" and y, y', y" represent the mole fractions of the divalent and tetravalent cations, respectively, each having independent values ranging from 0 to 0.3 so long as the sum of either $(x+x'+x'')$ or $(y+y'+y'')$ does not exceed 0.4. When the sums of $(x+x''+x'')$ and $(y+y'+y'')$ both equal zero the powder produced by hydrothermal synthesis is simple barium titanate. The powder is uniquely characterized by its high purity, fine submicron size, lack of aggregation and very narrow particle size distribution. When $x=x'=x''=y'=y''=0$ and y is greater than 0, the resulting product is a BaTiO$_3$ coform where y mole fractions of Ti(IV) in BaTiO$_3$ have been replaced by Sn(IV) to give a product with the nominal formula BaTi$_{(1-y)}$-Sn$_y$O$_3$. Conversely, when $x'=x''=y=y'=y''=0$ and x is greater than zero, the coform has the composition Ba$_{(1-x)}$Pb$_x$TiO$_3$. Since the values of x, x', x'', y, y', and y'' can each adopt a wide range of values (within the cited limits), many combinations of coforms with a large range of compositions can be prepared, and each of these coforms is uniquely characterized by the fact that it is stoichiometric, dispersible, and submicron with a narrow particle size distribution.

In the preferred embodiment of the present invention, high purity, unaggregated, dispersible, submicron barium titanate powder is produced by introducing, over a fixed period of time, a hot solution of 0.2 to 1.0 molar Ba(OH)$_2$ into a vigorously stirred slurry of a high surface area hydrous titania having a temperature ranging from 50° to 200° C. and, more preferably, between 60° to 150° C. As the Ba(OH)$_2$ is introduced into the slurry, the reaction

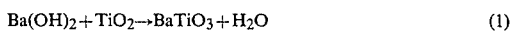

$$Ba(OH)_2 + TiO_2 \rightarrow BaTiO_3 + H_2O \qquad (1)$$

occurs and, it is believed, BaTiO$_3$ precipitation is initiated by a nucleation burst. As the Ba(OH)$_2$ addition process is continued, the conditions are such that nuclei growth rather than further nucleation occurs. Since little additional nucleation occurs, a product with a narrow primary particle size distribution results. The Ba(OH)$_2$ addition process is continued until the Ba/Ti mole ratio in the slurry is greater than unity and is typically between 1.1 to 1.3. The slurry is then held at temperature for 10 to about 30 minutes, with lower processing temperatures requiring the longer hold times, whereby 95 to 98% of the TiO$_2$ is converted to BaTiO$_3$. Thereafter, to ensure complete conversion of the TiO$_2$ to BaTiO$_3$, the slurry may be heated to 150° to 200° C. and preferably to at least 175° C. This final slurry typically contains about 0.2 moles of BaTiO$_3$ per liter of solution. The solution also contains 0.02 to 0.06 M/L Ba(OH)$_2$.

After cooling to an appropriate temperature, the slurry is pressure filtered to give a cake of stoichiometric BaTiO$_3$ containing over 75 weight percent, and typically between 80 to 85 weight percent, solids. Since washing, depending on wash water volume, wash water pH and temperature, can reduce the Ba/Ti mole ratio in the product, it is preferred to wash the product with a dilute Ba(OH)$_2$ solution, say a 0.01 to 0.02M Ba(OH)$_2$ solution. In view of the high solids content of the cake, the quantity of Ba in the volume of wash solution trapped in the cake will contribute less than 0.2 mole percent Ba to the Ba-content of the BaTiO$_3$ product. Alternatively, if the residual Ba(OH)$_2$ content of the slurry is small, the washing step can be entirely eliminated.

By altering the number of nuclei formed in the nucleation burst, the particle size of the barium titanate powder produced according to the method of the present invention may be controlled. The formation of a large number of nuclei indicates that a fine particle size will be attained; conversely, the formation of fewer nuclei will result in a barium titanate powder having a larger primary particle size.

In order to achieve an increased number of nuclei and hence reduced product primary particle size, the time interval for the addition of the Ba(OH)$_2$ should be relatively short, preferably less than 0.3 minutes. On the other hand, as the time interval for Ba(OH)$_2$ addition is increased, the primary particle size of the barium titanate powder correspondingly increases. At prolonged addition times, however, such as 12 minutes at 120° C., for example, aggregation of the primary particles can occur which adversely affects product dispersibility. The reaction temperature should also be controlled to ensure that an optimal number of BaTiO$_3$ nuclei are formed. A reduced reaction temperature favors the formation of fewer nuclei and thus the formation of products with larger primary particle sizes. A reaction temperature ranging from 50° to 200° C. is satisfactory for the production of the BaTiO$_3$ nuclei although the preferred temperature range is between 60° C. and 150° C. For the same set of synthesis conditions, a hydrous titania of reduced surface area favors formation of fewer nuclei and hence BaTiO$_3$ products of increased primary particle size. The concentration of the reactants utilized also affects the nucleation process with increasing reactant concentration tending to somewhat reduce product primary particle size but increasing product polydispersity. As will become apparent from the Examples which follow, an appropriate choice of each of these processing variables will result in the production of dispersible, submicron barium titanate and barium titanate based powders with very narrow particle size distributions.

The preferred method for producing the multi-component coforms of barium titanate is similiar to that utilized to synthesize simple barium titanate. In cases where the coforms do not contain either Pb(II) or Ca(II), a heated solution of Ba(OH)$_2$ or a heated solution of Ba(OH)$_2$ containing the requisite amount of Sr(OH)$_2$, at a temperature between 70° C. and 110° C., is added in a fixed time interval to a vigorously stirred slurry of the hydrous oxides of tetravalent cations at a prescribed temperature in the range of 60° to 200° C. In these cases the stoichiometric excess of Ba(OH)$_2$ used need not be as carefully controlled as when Pb(II) and Ca(II) are present. Although all the required kinetic experiments have not yet been performed, it is believed the reactivity of the hydrous oxides decreases in the order Ti(IV) then Sn(IV then Zr(IV) and Hf(IV). As a consequence, shortly after the addition of the hydroxide is initiated either BaTiO$_3$ or, if Sr(OH)$_2$ is present, a solid solution of BaTiO$_3$-SrTiO$_3$ forms by a nucleation burst. As in the case described for BaTiO$_3$, the number of nuclei formed increases with increase in rate of hydroxide addition, temperature, hydrous oxide surface area and reactant concentrations. As the addition of the soluble divalent cation hydroxide is continued, nuclei growth rather than additional nucleation occurs. After addition of hydroxide is completed, the slurry, depending on temperature, may contain some quantities of unreacted hydrous oxides. When the slurry is heated to elevated temperatures, up to about 225° C., the unreacted hydrous oxides combine with the soluble divalent cation hydroxides mostly on the surfaces of the particles already present. As a consequence of this nucleation and growth mechanism, coforms with primary particle sizes in the range of 0.05 to 0.4 micron with narrow size distributions are produced.

In cases where the coforms are desired to contain Pb(II) and/or Ca(II), the oxide or hydroxide of Pb and/or Ca(OH)$_2$ are first hydrothermally treated with a stoichiometric excess of the hydrous oxides of the tetravalent cations at temperatures up to 200° C.. Both nitrogen surface area (BET) measurements and transmission electron micrographs of the products formed indicate that they consist of extremely fine sized (sizes below about 0.02 micron) Pb(II) and/or Ca(II) containing perovskites in combination with a mass of high surface area unreacted hydrous oxides. Thereafter, as already noted, the slurry is typically cooled to a prescribed temperature and addition of soluble divalent cation hydroxide is initiated. Shortly after hydroxide addition is commenced, it is believed that a nucleation burst occurs both in the medium but primarily on the surfaces of the Pb(II) and/or Ca(II) perovskites already present. As additional hydroxide is introduced particle growth, rather than additional nucleation, occurs. Again, coform particle size is dependent on the same set of parameters as those controlling the size of BaTiO$_3$.

Briefly, in the process employed for producing the submicron dispersible coforms, a vigorously stirred slurry of the relatively insoluble divalent oxides or hydroxides, that is of Pb(II) and Ca(II), and the total amount of the hydrous oxides of TiO$_2$, SnO$_2$, ZrO$_2$ and HfO$_2$, preferably coprecipitated in the appropriate molar ratio, is hydrothermally treated at temperatures up to 200° C.. At the elevated temperature the relatively insoluble divalent metal oxides and/or hydroxides combine with the tetravalent hydrous oxides to form one or more perovskites. Since the molar ratio of the relatively insoluble divalent cations to tetravalent hydrous oxides is less than 0.4 and, preferably less than 0.3, after perovskite formation substantial amounts of unreacted hydrous oxides remain. The temperature of the slurry, containing the mixture of perovskites and unreacted hydrous oxides, is adjusted to a prescribed temperature between 50° and 200° C. but more preferably between 60° and 150° C. and then a heated solution containing the requisite amounts of Ba(OH)$_2$ and Sr(OH)$_2$ is introduced at a constant rate over a specified time period. Thereafter, the resulting slurry is held at temperature for 10 to 30 minutes and then, if required, heated to an elevated temperature to ensure complete conversion of the tetravalent hydrous oxides to stoichiometric perovskites. Product morphology of the multi-component coform is affected by the same combination of variables as those used to control BaTiO$_3$ morphology. It should be mentioned that although no experiments have been performed with Hf(IV), the chemistries of Hf(IV) and Zr(IV) are very similar and, for this reason, Hf(IV)-containing coforms are included here.

In the process of producing coforms, the stoichiometric excess of Ba(OH)2 employed and the final temperature to which the slurry is heated and, to a certain extent, the time at temperature must be controlled. Experimental data, to be described later, show that in the presence of excess Ba(OH)$_2$ the perovskites CaTiO$_3$ and PbTiO$_3$ can undergo the following displacement reactions:

$$CaTiO_3 + Ba(OH)_2 \rightarrow BaTiO_3 + Ca(OH)_2 \quad (2)$$

$$PbTiO_3 + Ba(OH)_2 \rightarrow BaTiO_3 + Pb(OH)_2 \quad (3)$$

These displacement reactions are favored by high Ba(OH)$_2$ concentrations especially at elevated temperatures and give rise to non-stoichiometric products.

It has also been found that in the presence of Ba(OH)$_2$ the equilibrium reaction $$PbTiO_3 + OH^- \rightarrow HPbO_2^- + TiO_2 \quad (4)$$

can occur. The TiO$_2$ formed rapidly reacts with the excess Ba(OH)$_2$, as shown by reaction (1), to form BaTiO$_3$. Although the combination of reactions (1) and (4) do not lead to the formation of a non-stoichiometric product, they indicate that the Pb-content of the coform can only be controlled when the OH$^-$ concentration in solution is controlled. Thus, in the synthesis of Ca(II) and/or Pb(II) containing coforms the stoichiometric excess of Ba(OH)$_2$ should be relatively small and, within limits, well controlled. Further, since the rates of displacement reactions increase with temperature, the final treatment temperature employed will represent a compromise between coform composition, treatment temperature, time at temperature and stoichiometric excess of Ba(OH)$_2$.

In the process employed for producing submicron, dispersible doped barium titanate or doped coforms, the requisite amounts of the dopant or dopants are intimately mixed with the tretavalent hydrous oxide or oxides. Intimate mixing can be accomplished by one of a variety of methods. For example, the dopants can be coprecipitiated with the tetravalent hydrous oxides. This method, however, is not applicable to all dopants because some, like Co(II) and Ni(II), will be incompletely precipitated during the ammoniacal neutralization process as a result of the formation of complex amines. Alternatively, the dopants can be precipitated as high surface hydrous oxides which can then be slurred with the tetravalent hydrous oxides. Finally, since the dopants are precipitated in aqueous media containing alkaline earth hydroxides, they can be added as solutions of acetates, formates or nitrates to the tetravalent hydrous oxides.

The dopant or dopants, typically, represent less than five, and more preferrably less than three, mole percent of the tetravalent hydrous oxides. After their addition the slurry, depending on product composition, is treated in analgous manner to those described above for barium titanate or one of its various coforms. After filtration and washing high solids cakes are obtained. Provided that the dopant or dopants represent less than 5 mole percent of the barium titanate or the coform, their product morphology is similar to those formed in the absence of dopants. Moreover, the same combinations of treatment parameters used to alter the median primary particle sizes of the undoped products can be used to alter the median primary particle sizes of the doped products.

Product stoichiometry will depend on the dopant or dopants employed. Some dopants, such as Mn(II) or Co(II) do not react under the hydrothermal synthesis conditions described here with either the divalent alkine earth and lead(II) cations or the tetravalent hydrous oxides. Accordingly, in these cases a stoichiometric barium titanate or a stoichiometric coform containing the dopant, as an oxide or as a hydrous oxide, is formed.

Other dopants, under the hydrothermal synthesis conditions employed here, may react with either the tetravalent hydrous oxides or the alkaline earth and Pb(II) cations. For example, Nb(V) reacts with Ba(II) to form BaNb$_2$O$_6$. In such cases, product stoichiometry can be varied by a variety of methods know to those skilled in the art. For example, the barium content of the product can be increased by addition of the requisite amount of a solution of ammonium carbonate or, where applicable, by controlling the extent of the displacement reactions.

The hydrothermal synthesis of doped and undoped barium titanate and coforms of barium titanate according to the present invention is further illustrated by the following non-limiting examples.

EXPERIMENTAL PROCEDURE

Image analysis was used to determine product primary particle size and primary particle size distribution of the powders produced. 500 to 1000 particles were sized in a plurality of TEM fields so as to obtain the equivalent spherical diameters of the primary particles. Two or more touching particles were visually disaggregated and the sizes of the individual primary particles were measured. The equivalent spherical diameters were used to compute the cumulative mass percent distribution as a function of primary particle size. The median particle size, by weight, was taken to be the primary particle size of the sample. The quartile ratio, QR, defined as the upper quartile diameter (by weight) divided by the lower quartile diameter, was taken as the measure of the width of the distribution. Monodisperse products have a QR value of 1. Products with QR values ranging from 1.0 to about 1.5 are classified as having narrow size distributions; those with QR values ranging from 1.5 to about 2.0 have moderately narrow distributions while those with values substantially greater than 2.0 have broad size distributions.

The equivalent spherical diameters were also used to compute surface areas from TEM data. Comparable TEM and $N_2$ surface areas indicate the primary particles are essentially nonporous.

Experience indicated that the morphological characteristics of both $BaTiO_3$ and $BaTiO_3$ coforms could be rapidly and reliably classified as having a narrow, moderately narrow and broad particle size distribution by a visual examination of the TEM's. For products with a narrow size distribution, average primary particle size could be readily determined by sizing 20 to 30 particles. It was found that the relationship $D=6/\rho S$, where D is particle diameter (microns), $\rho$ is density (g/cc) and S is $N_2$ surface area ($m^2/g$), could be used to obtain a good measure of the primary particle size of stoichiometric coforms.

Product dispersibility was assessed by comparing the primary particle sizes and size distributions determined by image analyses with the comparable values determined by sedimentation procedures. The sedimentation process gives the particle Stokes diameter which, roughly, corresponds to the equivalent spherical diameter. Two sedimentation methods, the Joyce Loebl Disc Centrifuge (Vickers Instruments, Ltd., London, U.K.) and the Micromeritics Sedigraph (Norcross, Ga.) were employed to determine cumulative mass percent distributions in terms of Stokes diameters from which the median Stokes diameters and the QR values were calculated.

In determining particle size by sedimentation, the powders were dispersed by a 15 to 30 minutes sonification in either water containing 0.08 g/L sodium tripolyphosphate at pH 10 or in isopropanal containing 0.08 or 0.12 weight percent Emphos PS-21A (Witco Organics Division, 520 Madison Ave., New York).

Particle size determined by image analysis and by sedimentation depend on different principles. For this reason an exact correspondence in size by these two methods is not always obtained. Moreover, as already noted, in image analysis touching particles are visually disaggregated. In the sedimentation process bound or flocculated particles act as single entities. These entities arise because of the existence of some bonding (e.g., necking) between the primary particles to give cemented aggregate which cannot be readily broken down during the sonification process and because of less than optimum dispersion stability which leads to some flocculation. Thus, QR values determined by sedimentation are expected, and found, to be larger than those found by image analysis. It is likely that under optimum dispersion conditions the QR value will be within the two sets of values cited here.

Two additional measures were used to assess dispersibility. In the first method, the mass fraction of the product having a Stokes diameter greater than one micron was used as a measure of the amount of hard-to-disperse aggregates. In the second method, a product was classified as being dispersible if the bulk of the primary particles in the TEM's were present as single particles. When substantial necking was observed the product was classified as aggregated.

Produce composition and stoichiometry were determined by elemental analysis using inductively coupled plasma spectroscopy after sample dissolution. The precision of the analyses was about ±1%. The molar ratio of the sum of the divalent cation to the sum of tetravalent cations, $X(II)/Y(IV)$, was used as a measure of stoichiometry. Products were taken to be stoichiometric when $X(II)/Y(II)=1.000\pm0.015$.

Reagent grade chemicals or their equivalents were used throughout. The purity of the final powder is dependent, in part, on the purity of the reactants employed. For example, the reagent grade $Ba(OH)_2\cdot 8H_2O$ employed contained about 0.2 weight percent Sr. Since, as will be shown, Sr in the reactant tends to concentrate in the product, a knowledge of the level of Sr present in $Ba(OH)_2\cdot 8H_2O$ is important. $Ba(OH)_2$ and/or $Sr(OH)_2$ solutions, maintained at 70°–100° C., were filtered prior to use to remove any carbonates present. $CaCO_3$ was calcined at 800° C. to give CaO. The latter compound when contacted with water gives $Ca(OH)_2$. $Pb(OH)_2$ was prepared by neutralizing a $Pb(NO_3)_2$ solution with $NH_3$. The washed hydroxide wet cake was used in subsequent experiments.

Hydrous oxides of $TiO_2$, $SnO_2$ and $ZrO_2$ were prepared by neutralizing aqueous solutions of their respective chlorides with $NH_3$ at ambient temperatures. The products were filtered off and washed until chloride-free (as determenced by $AgNO_3$) filtrates were obtained. The surface areas of the hydrous oxides, determined after drying at 110° C., were about 380, 290 and 150 $m^2/g$ for $TiO_2$, $SnO_2$ and $ZrO_2$, respectively. In addition, coprecipitates of hydrous $TiO_2$ and $ZrO_2$ or hydrous $TiO_2$ and $SnO_2$ were prepared by neutralizing aqueous solutions of the chlorides of Ti(IV) and Sn(IV) or Ti(IV) and Zr(IV).

All experiments were performed in a 2 liter autoclave (Autoclave Engineers). To prevent product contamination all wetted parts of the autoclave were coated with Teflon. Since an autoclave was employed, the introduction of carbon dioxide from the atmosphere (which combines with Ba(II), or Sr(II), or Ca(II) in solution to form insoluble carbonates) into the system was avoided. Prefiltered solutions of $Ba(OH)_2$ or $Sr(OH)_2$ and $Ba(OH)_2$ stored under nitrogen, were employed. The filtered $Ba(OH)_2$ or $Ba(OH)_2$ and $Sr(OH)_2$ solutions were introduced into the autoclave either by means of a high pressure pump or by rapidly discharging a solution of the hydroxide or hydroxides, contained in a heated bomb, into the autoclave by means of high pressure nitrogen. The contents of the autoclave were stirred by means of a one inch diameter turbine type stirrer operated at 1500 RPM throughout the synthesis process. After systhesis, the slurries were, typically, transferred to a pressure filter without exposure to air, filtered and then dried either under vacuum or under nitrogen at 100° to 110° C.

Examples I–VIII; Barium Titanate

In order to demonstrate the effects of various treatment parameters on BaTiO$_3$ morphology, a series of BaTiO$_3$ products were synthesized under various hydrothermal treatment conditions. In the synthesis process, 0.64 L of a slurry of hydrous TiO$_2$ was preheated to a specified temperature. Thereafter, a specified preheated volume of Ba(OH)$_2$ was added at a constant rate to the slurry in a specified time interval. In all cases, except that for Example IV, about 0.46 L of 0.52M Ba(OH)$_2$ was employed. In Example IV 0.59 L of 0.8M Ba(OH)$_2$ was added to the slurry.

In all examples of this section, except for Example VI, the hydrous TiO$_2$ employed had an initial surface area of about 380 m$^2$/g. Experiments showed that hydrothermal treatment of the hydrous TiO$_2$ to the required specified temperature decreases hydrous TiO$_2$ surface area. The magnitude of this decrease increases with increase in temperature, time at temperature and slurry pH. Under the experimental conditions of this work, where lengthy preheat times were employed, hydrous TiO$_2$ surface area declined to about 300 m$^2$/g at 150° C. and to about 150 m$^2$/g at 200° C. In Example VI the hydrous TiO$_2$ surface area was reduced to 54 m$^2$/g by a preliminary hydrothermal treatment of the hydrous TiO$_2$ at 200° C. in the presence of NH$_4$OH for several hours.

After Ba(OH)$_2$ addition, the slurries were held at temperature for 20 minutes, heated to 200° C., cooled and then filtered by pressure filtration. The solids, recovered as wet cakes containing more than 80 weight percent solids, were dried at 110° C. and analyzed for divalent to tetravalent cation mole ratio. In addition, the Ba contents of the filtrates were determined. Further details of the synthesis conditions used for each example, the resulting product stoichiometry and the filtrate Ba content are summarized in Table I. All products, within the precision of the results, are stoichiometric.

Product morphology and dispersibility were evaluated either quantitatively by image and sedimentation analyses or visually from electron micrographics. The results obtained are summarized in Table II. Apart from the product of Example I, it is apparent the products are dispersible, have narrow or moderately narrow size distributions and have average primary particle sizes in the range from 0.06 to 0.2 micron. Further, the results demonstrate that product primary particle size is increased by decreasing synthesis temperature, increasing Ba(OH)$_2$ addition time (within limits), decreasing TiO$_2$ surface area and, to some extent, decreasing reactant concentrations. The agreement between the surface areas, determined by image analysis with those obtained from N$_2$ adsorption, indicates that the primary particles are nonporous. Thus, N$_2$ surface area measurements can be used as a reliable guide to primary particle size.

TABLE I

Experimental Conditions Employed in BaTiO$_3$ Synthesis

| Example No. | TiO$_2$ moles | Temp. °C. | Ba(OH)$_2$ Addition Time, min. | X(II) Y(IV) | Ba g/L |
|---|---|---|---|---|---|
| I | 0.2 | 150 | 12.0 | ND | ND |
| II | 0.2 | 150 | 2.8 | 0.983 | 7.8 |
| III | 0.2 | 150 | 0.2 | 0.999 | (a) |
| IV | 0.395 | 150 | 3.2 | 1.014 | 2.6 |
| V | 0.2 | 120 | 3.1 | 0.998 | 9.8 |
| VI | 0.2 | 120 | 2.9 | 1.006 | 3.8 |
| VII | 0.2 | 80 | 3.1 | 1.005 | 6.4 |
| VIII | 0.2 | 200 | 0.1 | 1.009 | 9.8 |

ND = not determined, (a) = product washed with ammoniated CO$_2$-free water having a pH of 11.5

TABLE II

Morphological Characteristics of BaTiO$_3$ Products

| | Image Analysis | | | Sedimentation | | |
|---|---|---|---|---|---|---|
| Example No. | Size micron | QR | Area m$^2$/g | Size micron | QR | Area m$^2$/g |
| I | ND | agg. | ND | ND | ND | 8.0 |
| II | 0.11 | 1.31 | 9.5 | 0.13 | 1.6 | 11.2 |
| III | 0.07 | n | ND | 0.10 | 1.7 | 16.4 |
| IV | 0.10 | mn | ND | 0.16 | 1.5 | 10.4 |
| V | 0.13 | 1.29 | 7.9 | 0.16 | 1.6 | 9.2 |
| VI | 0.15 | mn | ND | ND | d | 6.8 |
| VII | 0.19 | mn | ND | 0.24 | 1.5 | 5.7 |
| VIII | 0.06 | 1.33 | 17.8 | 0.08 | 2.0 | 15.6 | agg = aggregated; n = narrow; mn = moderately narrow; d = dispersible by TEM

A TEM of a sample of Example V demonstrated that the primary particles are substantially spherical in shape and uniform in size. Although the majority of the primary particles were unaggregated, a few firmly bonded doublets, triplets, etc. were also present. This TEM, after adjustment for magnification, was typical of those obtained for all products having QR values, by image analysis of about 1.3. The TEM of Example I, conversely, showed the presence of extensive necking between the primary particles.

Examples IX and X; Sr-Containing Coforms

Two hydrous TiO$_2$ slurries, each containing 0.2 moles TiO$_2$ in 0.64 L water, were preheated to 1200° C. To each slurry 0.46 L of a preheated solution containing Ba(OH)$_2$ and Sr(OH)$_2$ was added in either 1.6 minutes (Example IX) or in 3.2 minutes (Example X). The concentrations of the hydroxides as well as the Sr/Ba mole ratio employed are listed in Table III under the "Feed" column. After hydroxide addition, the slurries were treated in an analogous manner to that used for BaTiO$_3$ synthesis. After filtration, the filtrate Sr and Ba contents and Sr/Ba mole ratio and the solid product stoichiometry and N$_2$ surface area were determined. The results of these analyses are listed in Table III.

TABLE III

Sr-Containing Coforms

| | Feed | | | Filtrate | | | Solids | |
|---|---|---|---|---|---|---|---|---|
| Example No. | Ba(OH)$_2$ M/L | Sr(OH)$_2$ M/L | Sr/Ba mole ratio | Ba(OH)$_2$ M/L | Sr(OH)$_2$ M/L | Sr/Ba mole ratio | X(II) Y(IV) | Area m$^2$g |
| IX | 0.470 | 0.021 | 0.045 | 0.026 | 0.0001 | 0.004 | 1.002 | 10.1 |

TABLE III-continued

| | Sr-Containing Coforms | | | | | | | |
|---|---|---|---|---|---|---|---|---|
| | Feed | | | Filtrate | | | Solids | |
| Example No. | Ba(OH)$_2$ M/L | Sr(OH)$_2$ M/L | Sr/Ba mole ratio | Ba(OH)$_2$ M/L | Sr(OH)$_2$ M/L | Sr/Ba mole ratio | $\frac{X (II)}{Y (IV)}$ | Area m$^2$g |
| X | 0.433 | 0.072 | 0.168 | 0.046 | 0.0002 | 0.004 | 1.023 | 11.6 |

The data in the table indicate that the solid product of Example IX is stoichiometric but that the solid product of Example X has a slightly high divalent cation content. In the latter case, the divalent cation excess is attributed to a somewhat larger than desired Ba(OH)$_2$ concentration in the filtrate increasing the divalent cation content of the product by mother liquor entrapment and, very probably, by Ba(OH)$_2$ adsorption. Washing the solids with either 0.01 to 0.02M Ba(OH)$_2$ or with CO$_2$-free ammoniated water would reduce the divalent cation content of the product so that a stoichiometric product would result.

The Sr/Ba mole ratios in the feeds are considerably larger than those in the filtrates. Also, the Sr contents of the filtrates are very small. This means that Sr concentrates in the solid phase and, for this reason, the Sr/Ba mole ratios in the products, 0.058 in Example IX and 0.245 in Example X, are larger than the comparable values in the feeds.

X-ray diffraction for the solid of Example X indicated that a solid solution of BaTiO$_3$ and SrTiO$_3$ was present. Comparison of N$_2$ surface areas of the products of Examples V, IX and X indicates that as the Sr content of the hydroxide is increased product primary particle size decreases. Products with comparable primary particle sizes can be readily obtained by varying the same combination of treatment variables as was used to vary the primary particle size of BaTiO$_3$. Finally, electron micrographs of these Sr-containing coforms demonstrated that their morphologies, other than for the small differences in particle size, were comparable to that of BaTiO$_3$ shown in FIG. 1.

A series of pure SrTiO$_3$ products were also synthesized by addition of a solution of Sr(OH)$_2$ to hydrous TiO$_2$ under some of the same sets of conditions used in the synthesis of BaTiO$_3$. In these cases, however, although stoichiometric products were formed, TEM and N$_2$ surface area results indicated that product primary particle size was substantially smaller than those for BaTiO$_3$. Moreover, in all cases studied, SrTiO$_3$ primary size was smaller than 0.05 micron.

Examples XI to XVI; Zr-Containing Coforms

A series of Zr-containing coforms were synthesized by treating 0.64 L of preheated slurries of hydrous TiO$_2$ and ZrO$_2$, prepared either by mixing the individual hydrous oxides or by coprecipitation, with 0.46 L of preheated 0.52 to 0.6M Ba(OH)$_2$. The synthesis procedure was identical with those described above. The quantities of hydrous oxides, the synthesis temperatures and Ba(OH)$_2$ addition times employed as well as the Ba(II) contents of the filtrates obtained are summarized in Table IV. In Example XVI only hydrous ZrO$_2$ was used and pure BaZrO$_3$ was synthesized. The characteristics of the solid products are shown in Table V.

The Zr(IV)/Ti(IV) mole ratio in the products, found by analysis in Table V, range from 0.117 to 0.235. The values given in Table IV (other than for Example XV, where the mole ratio for this coprecipated wet cake was found by analysis) are based on cake weights and their contained solids. Since only trivial amounts, at the ppm level, of Zr(IV) or Ti(IV) were detected in the filtrates, the Zr(IV)/Ti(IV) mole ratios in the two tables should be identical. For the cases where physical mixtures of hydrous TiO$_2$ and ZrO$_2$ were employed (Examples XI to XIV) the Zr(IV)/Ti(IV) mole ratios based on cake weights are 12.1±1.3% lower than those found by analysis. Since the analytical data shown in Table V indicate that the X(II)/Y(IV) mole ratios are essentially unity and thus the coforms are stoichiometric, the discrepency between the two sets of Zr(IV)/Ti(IV) mole ratios is attributed to an incorrect determination of the solids contents of the hydrous oxide wet cakes.

The morphologies and surfaces areas of products synthesized from physical mixtures of hydrous TiO$_2$ and ZrO$_2$ are comparable with those attained for BaTiO$_3$ using the same set of synthesis conditions. With coprecipitated hydrous TiO$_2$-ZrO$_2$, Example XV, the TEM primary particle size is somewhat larger than the product formed from a physical mixture of the hydrous oxides under the same synthesis conditions (Example XIV). Qualitatively, all the coforms appeared to have narrow size distributions and to be dispersible. X-ray diffraction indicated that the coforms consisted of a mixture of co-crystallized BaZrO$_3$ and cubic BaTiO$_3$.

TABLE IV

| | Experimental Conditions Employed in the Synthesis of Zr-Containing Coforms | | | | | |
|---|---|---|---|---|---|---|
| Example No. | TiO$_2$ moles | ZrO$_2$ moles | $\frac{Zr(IV)}{Ti(IV)}$ | Temp. °C. | Ba(OH)$_2$ Addition Time, min | Filtrate Ba(II) g/L |
| XI | 0.18 | 0.02 | 0.111 | 120 | 3.1 | 6.4 |
| XII | 0.17 | 0.03 | 0.176 | 120 | 3.1 | 6.8 |
| XIII | 0.17 | 0.03 | 0.176 | 200 | 0.15 | 14.6 |
| XIV | 0.166 | 0.034 | 0.205 | 120 | 3.0 | 11.8 |
| XV(a) | 0.183 | 0.016 | 0.198 | 120 | 3.0 | (c) |
| XVI | 0.000 | 0.200 | (b) | 120 | 0.2 | 7.2 |

(a) Coprecipated hydrous ZrO$_2$ - hydrous TiO$_2$ employed.
(b) No Ti(IV) in product.
(c) Product was washed with 0.01 M Ba(OH)$_2$.

In Example XVI BaZrO$_3$ was synthesized under conditions which result in the formation of about 0.06 micron BaTiO$_3$ or BaTiO$_3$ based coforms. Such products, typically, have N$_2$ surface areas of about 16 m$^2$/g. With BaZrO$_3$, however, product primary particle size was found to be about 1.5 micron, product surface area was 2.8 m$^2$/g and TEM data indicated that the product was aggregated.

TABLE V

| | Morphology and Composition of Zr-Containing Coforms | | | | | |
|---|---|---|---|---|---|---|
| Example No. | Image Analysis | | | $\frac{Zr(IV)}{Ti(IV)}$ | $\frac{X(II)}{Y(IV)}$ | N$_2$ Area m$^2$/g |
| | Size μm | QR | Dispersibility | | | |
| XI | 0.12 | n | d | 0.128 | 1.004 | 9.1 |
| XII | 0.12 | n | d | 0.192 | 1.006 | 9.8 |
| XIII | 0.006 | n | d | 0.200 | 1.006 | 15.5 |
| XIV | 0.13 | n | d | 0.235 | 1.018 | 8.3 |
| XV | 0.18 | n | d | 0.190 | 0.993 | 11.7 |

TABLE V-continued

Morphology and Composition of Zr-Containing Coforms

| Example No. | Size μm | QR | Dispersibility | Zr(IV) Ti(IV) | X(II) Y(IV) | N₂ Area m²/g |
|---|---|---|---|---|---|---|
| XVI | 1.5 | mn | agg. | (a) | 1.009 | 2.8 |

(a) No Ti(IV) present.

Examples XVII–XX; Sn-Containing Coforms

A series of Sn-containing coforms were synthesized by treating 0.64L of preheated slurries of hydrous $TiO_2$ and $SnO_2$, prepared either by mixing the individual hydrous oxides or by coprecipitation, with 0.46L of preheated 0.52 to 0.60M $Ba(OH)_2$. The synthesis procedure was comparable with those used for the synthesis of $BaTiO_3$. The quantities of hydrous oxides, the synthesis temperatures and $Ba(OH)_2$ addition times employed as well as the Ba(II) contents of the filtrates are summarize in Table VI. In Example XX only hydrous $SnO_2$ was employed. The characteristics of the solid products formed are shown in Table VII.

TABLE VI

Experimental Conditions Employed in the Synthesis of Sn-Containing Coforms

| Example No. | TiO₂ moles | SnO₂ moles | Sn(IV) Ti(IV) | Temp. °C. | Ba(OH) Addition Time, min | Filtrate Ba(II) g/L |
|---|---|---|---|---|---|---|
| XVII(a) | 0.172 | 0.0146 | 0.085 | 150 | 3.1 | 11.8 |
| XVIII(a) | 0.172 | 0.0146 | 0.085 | 150 | 0.1 | 9.1 |
| XIX | 0.170 | 0.03 | 0.176 | 120 | 3.1 | 6.9 |
| XX | 0.000 | 0.200 | (b) | 120 | 3.1 | 4.0 |

(a) Coprecipitated hydrous oxides employed.
(b) No Ti(IV) present in product.

TABLE VII

Morphology and Composition of Sn-Containing Coforms

| Example No. | Size μm | QR | Dispersibility | Sn(IV) Ti(IV) | X(II) Y(IV) | N₂ Area m²/g |
|---|---|---|---|---|---|---|
| XVII | 0.13 | n | d | 0.086 | 1.05 | 8.4 |
| XVIII | 0.07 | n | d | 0.086 | 1.04 | 16.2 |
| XIX | 0.14 | n | d | 0.195 | 1.04 | 6.3 |
| XX | (a) | (b) | agg | (c) | 1.05 | 0.13 |

(a) Particle size greater than 1 micron.
(b) Broad size distribution.
(c) No Ti(IV) present.

The Sn-containing coforms, as shown by the X(II)/Y(IV) mole ratios in Table VII, contain a small excess of the divalent cation. Since the filtrates have rather high Ba-contents, Table VI, and since the products were filtered but not washed, the excess divalent cation contents are attributed to adsorbed $Ba(OH)_2$. Experimental data, for other coforms, indicate that the divalent cation excess can be readily reduced to give stoichiometric products by washing. The data of Abe et al. are in support of this contention.

X-ray diffraction analysis indicated that the product of Example XX consists of barium hexahydrostannate, $BaSn(OH)_6$. In the case of the product of Example XVIII the only crystalline phase found was that of $BaTiO_3$. A scanning transmission electron microscope, STEM, coupled with an energy dispersive X-ray analysis capability, revealed that all the primary particles contained Sn, Ba and Ti although some variability in the Sn levels was noted.

A comparison of the data in Tables VI and VII with those in Tables I and II indicates that for a given set of synthesis conditions the $BaTiO_3$ and Sn-containing coforms have comparable morphologies.

Examples XXI–XXIII; Ca-Containing Coforms

Experiments have established that hydrothermal treatment of a slurry containing an equimolar mixture of $Ca(OH)_2$ and hydrous $TiO_2$ to temperatures up to 200° C. resulted in the formation of a product having the nominal composition $CaTiO_3$. X-ray diffraction analysis indicated that the product was, very probably, $CaTiO_3$ with tetragonal $Ca_4Ti_3O_{10}$ being a close second match. TEM's showed that the product consisted of roughly rectangular platelets. The product had a N₂ surface area of 16 m²/g.

In order to determine the extent of the displacement reaction, a $CaTiO_3$ product containing an excess of $Ca(OH)_2$ was synthesized. This was accomplished by hydrothermal treatment of a 1.0 L slurry containing 0.5 moles hydrous $TiO_2$ and 0.55 moles $Ca(OH)_2$. Analytical data showed that the product had a surface area of 14.4 m²/g and a Ca(II)/Ti(IV) mole ratio of 1.04. About 0.2 moles of this product (27.2 g on a dry basis) was dispersed in 0.6 L of water and heated to 80° C. Thereafter 0.4 L of 0.37M $Ba(OH)_2$ was added. The resulting slurry was held at 80° C. for 90 minutes and sampled. The remaining slurry was next heated to 120° C., held at temperature for 60 minutes and sampled. This procedure was repeated at 150° C. and at 200° C. The slurry samples were filtered and the filtrates and dried solids were analyzed.

TABLE VIII

Effect of Treatment of $CaTiO_3$ with $Ba(OH)_2$

| Slurry Temp. °C. | Filtrate, g/L Ba | Sr | Ca | Cation Mole Ratio in Solids Ca:Ba:Sr:Ti | X(II) Y(IV) | N₂ Area m²/g |
|---|---|---|---|---|---|---|
| 80 | 20.8 | 0.11 | 0.05 | 1.03:0.022:0.001:1.00 | 1.05 | 12.5 |
| 120 | 21.1 | 0.11 | 0.04 | 1.03:0.022:0.001:1.00 | 1.05 | 10.4 |
| 150 | 22.6 | 0.07 | 0.03 | 1.03:0.026:0.003:1.00 | 1.06 | 12.2 |
| 200 | 6.6 | 0.01 | 0.20 | 1.03:0.557:0.006:1.00 | 1.59 | 7.2 |

As shown by the Ba-concentration in the filtrate and the Ba mole ratio in the solid phase, the data in the table demonstrate that displacement reaction (2) occurs at 200° C. until quite low Ba-concentrations are attained. The $Ca(OH)_2$ formed is fairly insoluble and remains in the solid phase so that, as shown by the X(II)/Y(IV) mole ratio, a non-stoichiometric product is formed. At temperatures below about 150° C., however, the extent of reaction (2) is small even though a reasonable prolonged hold time was employed. Presumably, the displacement reaction is diffusion controlled and only at temperatures above about 150° C. is the diffusion coefficient of Ba(II) in $CaTiO_3$ sufficiently large that the extent of reaction (2) becomes large. It is expected that as the Ba(II) concentration in the aqueous phase declines the rate of reaction is reduced and becomes negligible at sufficiently low $Ba(OH)_2$ concentrations.

The feasibility of preparing a Ca-containing coform under conditions where, after $BaTiO_3$ formation, the $Ba(OH)_2$ concentration in the aqueous phase is small was investigated. In this case, Example XXI, the Ca-containing coform was prepared by hydrothermal treatment of 0.67 L of a slurry containing 0.21 moles of hydrous $TiO_2$ and 0.042 moles of $Ca(OH)_2$ to 200° C. The slurry was then cooled to 120° C. and 5% of the slurry (0.032 L) was withdrawn for characterization. Thereafter, 0.46 L of 0.41M Ba(OH)$_2$ was added in 3.1 minutes. The resulting slurry was held at 120° C. and sampled at 2, 10, 20 and 60 minutes after Ba(OH)$_2$ addition. The slurry temperature was then raised to 150° C., held for 60 minutes and sampled. Next, it was raised to 200° C., sampled, held at 200° C. for 30 minutes and resampled. All samples were filtered and the divalent cation concentrations in the filtrates were determined. The filter cakes were dried and their surface areas and nominal stoichiometries determined. The results obtained are summarized in Table IX.

TABLE IX

Effect of Treatment Variables on the Composition the Ca-containing Coform of Example XXI

| Slurry Temp °C. | Sample Time min | Filtrate, g/L | | | Cation Mole Ratio in Solids Ca:Ba:Sr:Ti | X(II) Y(IV) | N$_2$ Area m$^2$/g |
| --- | --- | --- | --- | --- | --- | --- | --- |
| | | Ba | Ca | Sr | | | |
| 120 | (a) | 0.00 | 0.004 | 0.00 | 0.199:0.000:0.000:1.00 | 0.199 | 291 |
| 120 | 2 | 15.94 | 0.084 | 0.12 | 0.188:0.381:0.009:1.00 | 0.578 | 83.7 |
| 120 | 10 | 6.14 | 0.225 | 0.01 | 0.155:0.631:0.018:1.00 | 0.804 | 27.2 |
| 120 | 20 | 4.02 | 0.330 | 0.00 | 0.143:0.783:0.019:1.00 | 0.945 | 17.0 |
| 120 | 60 | 2.93 | 0.404 | 0.00 | 0.133:0.830:0.018:1.00 | 0.981 | 12.7 |
| 150 | 60 | 2.62 | 0.446 | 0.00 | 0.127:0.842:0.019:1.00 | 0.988 | 12.0 |
| 200 | 1 | 1.47 | 0.556 | 0.00 | 0.110:0.888:0.019:1.00 | 1.017 | 8.1 |
| 200 | 30 | 1.60 | 0.554 | 0.00 | 0.113:0.883:0.019:1.00 | 1.015 | 6.5 |

(a) Sample taken before Ba(OH)$_2$ addition.

The solid phase of the initial sample, taken prior to Ba(OH)$_2$ addition, has a N$_2$ surface area of 291 m$^2$/g. Since treatment of pure hydrous TiO$_2$ to 200° C. results in fairly substantial decreases in surface area, the present surface area measurement confirms that the crystallite size of the calcium titanate, formed in the presence of hydrous TiO$_2$, is very small (less than about 0.02 micron). A TEM of the sample is in support of this contention.

After Ba(OH)$_2$ addition, the Ba-content of the solid phase increases and that of the filtrate decreases with time at 120° C. The initial Ba concentration, assuming no reaction, is estimated to be about 25.5 g/L. Two minutes after Ba(OH)$_2$ addition the Ba-content of the liquid phase decreases to 15.9 g/L and about 40% of the TiO$_2$ is converted to BaTiO$_3$. Accordingly, it is apparent that when the Ba(OH)$_2$ concentration in the aqueous phase is large, the rate of BaTiO$_3$ formation at 120° C. is rapid. As the Ba(OH)$_2$ concentration declines and the TiO$_2$ is transformed to BaTiO$_3$ the reaction rate decreases. At low Ba(OH)$_2$ concentrations, stoichiometric products are formed only at elevated temperatures. Surprisingly, as Ba is incorporated in the solid phase the Ca-content of the filtrate increases. Although the reason for this observation is not understood, it does account for the reduction of the Ca-content of the solid phase.

A TEM of the solid phase of Example XXI, taken after 1 minute at 200° C., indicated that the product had a primary particle size of 0.15 micron, a narrow size distribution and that the product was dispersible. Product primary particle size determined from surface area, 0.13 micron, is in good agreement with the TEM primary particle size.

The effect of Ba(OH)$_2$ addition time on Ca-containing coform morphology was investigated. For these purposes 0.64 L slurries containing 0.2 moles of hydrous TiO$_2$ and 0.02 moles of Ca(OH)$_2$ were heated to 150° C. Thereafter, 0.46 L of 0.43M Ba(OH)$_2$ was added in either 3.1 minutes (Example XXII) or in 0.1 minutes (Example XXIII) In the former example the slurry was held for 30 minutes at 150° C. prior to increasing its temperature to 200° C. after which it was sampled. In the latter example the slurry was held at 150° C. for 30 minutes and then sampled. The slurry filtrate composition and the solid phase surface areas and nominal stoichiometries are listed in Table X. Essentially stoichiometric products were formed. TEM data showed that the primary particle size of the product of Example XXII was about 0.12 micron and that Example XXIII was 0.06 micron. Further, the TEM's, after adjusting for magnification, were essentially identical to the TEM's of the pure barium titanate produced in Examples II-VIII. X-ray diffraction showed that the only crystalline phase present in these Ca-containing coforms was BaTiO$_3$. A STEM - energy dispersive X-ray analysis of the product of Example XXII, however, showed that each primary particle contianed Ca, Ti and Ba at fairly comparable levels.

TABLE X

Slurry Characteristics After Synthesis of Ca-containing Coforms

| Example No. | Filtrate g/L | | Cation Mole Ratio in Solids Ca:Ba:Sr:Ti | X(II) Y(IV) | N$_2$ Area m$^2$/g |
| --- | --- | --- | --- | --- | --- |
| | Ba | Ca | | | |
| XXII | 1.78 | 0.48 | 0.062:0.925:0.019:1.000 | 1.006 | 8.8 |
| XXIII | 2.48 | 0.40 | 0.079:0.916:0.009:1.000 | 1.004 | 17.1 |

Examples XXIV to XXIX; Pb-Containing Coforms

Literature data, for example see the article by T. R. N. Kutty and R. Balachandran titled "Direct Precipitation of Lead Zirconate Titanate by the Hydrothermal Method", Mat. Res. Bull., 19, 1479 (1984), indicate that hydrothermal treatment of slurries of PbO and hydrous TiO$_2$ to temperatures of about 160° C. for several hours results in the formation of X-ray crystalline PbTiO$_3$. These findings were confirmed in this work. Surprisingly, however, a hydrothermal treatment of a slurry containing Pb(OH)$_2$, determined to be crystalline by X-ray diffraction, and hydrous TiO$_2$ to temperatures of 200° C. gave only X-ray amorphous products. Although these products were not characterized, it is suspected that amorphous lead titanate products were formed.

A kinetic experiment showed that the rate of PbTiO$_3$ formation is rapid at 200° C. In this experiment 0.35 moles of X-ray crystalline, yellow PbO, having a surface area of 0.64 m$^2$/g, was dispersed in 0.2 L water. This slurry was rapidly added to 1.0 L of a slurry containing about 0.4 moles of hydrous TiO$_2$ preheated to 200° C. After addition of the PbO, the resulting slurry temperature decreased to 191° C. but increased back to 200° C. within 2 minutes. At this time the slurry was sampled and filtered. X-ray diffraction of the solids revealed that only crystalline PbTiO$_3$ was present. No peaks which could be attributed to PbO could be observed. Accordingly, the bulk of the PbO was transformed to PbTiO$_3$ within 2 minutes.

PbTiO$_3$ products were prepared by hydrothermal treatment of a slurry containing an equi-molar mixture of PbO and hydrous TiO$_2$, each present at a concentration of 0.33 moles/L, to 200°°C. The slurry was sampled as soon as a temperature of 200° C. was attained and after aging for two hours at 200° C. The N$_2$ surface area of the solid phase in the slurry samples decreased from 20.4 to 11.8 m$^2$/g on aging, presumably as a result of Ostwald ripening. TEM data showed that the products consisted of reasonably uniform but aggregated thin rectangular platelets.

Experiments were conducted in order to assess the importance of reactions (3) and (4). In these experiments a PbTiO$_3$ containing some hydrous TiO$_2$ was prepared by hydrothermal treatment of hydrous TiO$_2$ and PbO to 200° C. The resulting slurry was filtered and 81.2g of the wet cake, containing 56 weight percent solids, was dispersed in water and a slurry volume of 0.6 L was attained. The slurry was heated to 100° C. Thereafter, 0.3 L of preheated 0.375M Ba(OH)$_2$ was added in 2.8 min. After Ba(OH)$_2$ addition, the slurry was held at 100° C. for 90 minutes and then sampled. Next, the slurry was heated to 150° C., held at temparature for 30 minutes and sampled. This procedure was repeated at 200° and 250° C. The slurry samples were filtered. The divalent cation concentrations in the aqueous phase and the N$_2$ surface area and the cation mole ratio in the solid phase for each sample was determined. The results of these analyses are presented in Table XI.

tion (4), increases with increase in the Ba(OH)$_2$ concentration in the aqueous phase.

The present data indicate that in the synthesis of Pb-containing coforms, just as in the synthesis of Ca-containing coforms, the Ba content of the aqueous phase and the final temperature (and time) to which the slurry is exposed must be carefully controlled. Experiments were conducted to determine the maximum Ba concentration which can be tolerated in the aqueous phase at 200° C. before displacement reaction (3) occurs to a substantial extent. For these purposes 0.7 L of a slurry containing 0.22 moles of hydrous TiO$_2$ and 0.11 moles of PbO was heated to 200° C. At 200° C. the slurry was sampled by withdrawing 0.06 L of slurry. Immediately thereafter, 0.06 L of preheated 0.52M Ba(OH)$_2$ was rapidly added to the slurry. The slurry was held at temperature for 60 minutes and sampled. Next, a second 0.1 L aliquot of 0.52M Ba(OH)$_2$ was rapidly added. The slurry was then aged for an additional 60 minutes and sampled. Finally, a third 0.1 L aliquot of Ba(OH)$_2$ was added and after 60 minutes the slurry was sampled. The slurry samples were filtered and the aqueous and solid phases were characterized. The data obtained are summarized in Table XII.

TABLE XII

| Example No. | Aliquots of Ba(OH)$_2$ added | Filtrate, g/L | | | Cation Mole Ratio in Solids Ba:Pb:Sr:Ti | X(II) Y(IV) | Area m$^2$/g |
|---|---|---|---|---|---|---|---|
| | | Ba | Pb | Sr | | | |
| XXIV | 0 | 0.00 | 0.00 | 0.00 | 0.000:0.525:0.000:1.000 | 0.525 | 13.1 |
| XXV | 1 | 0.24 | 0.02 | 0.00 | 0.275:0.514:0.006:1.000 | 0.795 | 42.2 |
| XXVI | 2 | 4.14 | 0.88 | 0.00 | 0.514:0.487:0.014:1.000 | 1.015 | 13.1 |
| XXVII | 3 | 13.65 | 4.3 | 0.01 | 0.676:0.442:0.022:1.000 | 1.140 | 10.7 |

Effect of Ba(OH)$_2$ Concentration of Pb-Containing Coform Stoichiometry at 200° C.

The results indicate that after all the titania in the coform is converted to BaTiO$_3$ and the Ba content of the aqueous phase does not exceed about 4 g/L, corresponding to about 0.03M Ba(OH)$_2$ as in Example XXVI, a stoichiometric product is obtained even after a relatively lengthy treatment time at 200° C. When the Ba concentration is of the order of 13 g/L, as in Example XXVII, a non-stoichiometric product results.

A TEM of the product of Example XXIV did not show the presence of particles having the characteristic

TABLE XI

Effect of Treatment of PbTiO$_3$ with Ba(OH)$_2$

| Slurry Temp °C. | Time at Temp min | Filtrate, g/L | | | Cation Mole Ratio in Solids Ba:Pb:Sr:Ti | X(II) Y(II) | N$_2$ Area m$^2$/g |
|---|---|---|---|---|---|---|---|
| | | Ba | Sr | Pb | | | |
| 100 | (a) | 0.00 | 0.00 | ND | 0.000:0.772:0.000:1.000 | 0.772 | 16.7 |
| 100 | 90 | 16.1 | 0.13 | 1.50 | 0.080:0.763:0.011:1.000 | 0.854 | 15.4 |
| 150 | 30 | 12.6 | 0.02 | 1.97 | 0.266:0.738:0.012:1.000 | 1.016 | 9.5 |
| 200 | 30 | 9.7 | 0.01 | 2.81 | 0.379:0.717:0.013:1.000 | 1.109 | 8.8 |
| 250 | 30 | 5.7 | 0.00 | 1.67 | 0.464:0.733:0.012:1.000 | 1.209 | 7.0 |

(a) Prior to addition of Ba(OH)$_2$

The results indicate that only above about 150° C. does displacement reaction (3) occur at a significant rate. However, since at 250° C. the aqueous phase contains a substantial level of Ba, it must be concluded that the sensitivity of PbTiO$_3$ to the displacement reaction is less than that of CaTiO$_3$ (compare data in Tables XI and VIII). The amount of Pb in solution, presumably as a result of reaction (4), is fairly substantial. Moveover, it was found that under isothermal conditions (see Table XII) the amount of Pb in solution, as required by reacmorphology of PbTiO$_3$. All the primary particles in the TEM appeared to be substantially less than 0.02 micron. This observation is in accord with the high surface area, 131 m$^2$/g, of the product. Further, this observation confirms the contention, made previously, that the hydrothermal treatment of the insoluble divalent cation oxide or hydroxide with a substantial molar excess of hydrous TiO$_2$ gives perovskites with very small primary particle sizes.

TEM's of the products of Examples XXV, XXVI and XXVII showed that the primary particles of the products had a variety of shapes ranging from spheres to cubes to rectangular platelets. Further, the primary particle size distributions were fairly broad and the primary particles were somewhat aggregated. The diversity of shapes is attributed to the high Pb content of the coforms.

The effect of time of Ba(OH)$_2$ addition on the morphology of the Pb-containing coforms was investigated. In these experiments 0.64 L slurries containing 0.2 moles of hydrous TiO$_2$ and either 0.02 moles PbO (Example XXVIII) or 0.04 moles PbO (Example XXIX) were heated to 200° C. Thereafter, the slurries were cooled to 150° C. and 0.46 L of Ba(OH)$_2$ was added in either 3.1 or 0.25 minutes. The slurries were held at 150° C. for either 20 minutes (Example XXVIII) or 60 minutes (Example XXIX) and then heated to 200° C. after which the slurries were sampled. The samples were characterized in the usual manner and the data obtained are presented in Table XIII.

TABLE XIII

Effect of Ba(OH)$_2$ Addition Time on Pb-Containing Coform Morphology

| Example No. | Ba(OH)$_2$ Add Time, min | Filtrate, g/L Ba | Filtrate, g/L Pb | Cation Mole Ratio in Solids Ba:Pb:Sr:Ti | X(II)/Y(IV) | Area m$^2$/g |
|---|---|---|---|---|---|---|
| XXVIII | 3.1 | 9.4 | 0.59 | 0.926:0.089:(a):1.000 | 1.028 | 7.6 |
| XXIX | 0.25 | 10.6 | 2.74 | 0.810:0.173:0.024:1.000 | 1.007 | 11.5 |

(a) Not determined but estimated to be 0.013.

As shown in the table, the Ba-contents of the filtrates are higher than the desired value of about 4 g/L. Nevertheless, as shown by the X(II)/Y(IV) mole ratio, the observed deviation from stoichiometry is small in the case of Example XXVIII and, within the precision of the data, negligible in the case of Example XXIX. As in the synthesis of BaTiO$_3$, product surface area increases with decreased Ba(OH)$_2$ addition time.

TEM data indicated that the product of Example XXVIII had a primary particle size of about 0.13 micron while that of Example XXIX had a size of about 0.07 micron. In both cases, the primary particle size distributions were narrow and the products appeared to be dispersible. Moreoever, the TEM's, at the appropriate magnifications, resemble TEM's of barium titanate of FIG.1. Finally, a STEM—energy dispersive X-ray analysis of the product of Example XXIX demonstrated that all the primary particles contained Pb, Ba and Ti at comparable levels.

Examples XXX-XXXVIII; Complex Coforms

In Examples X to XXIX either Ba(II) in BaTiO$_3$ was partially replaced by a second divalent cation or Ti(IV) was partially replaced by a second tetravalent cation and relatively simple coforms were produced. More complex coforms were also synthesized by the simultaneous partial replacement of both the Ba(II) and Ti(IV) by one or more divalent and tetravalent cations. The systhesis procedure employed was identical with that used to make the simple Ca(II) and the Pb (II) contained coforms. In addition, it was found that the same set of parameters which controlled either BaTiO$_3$ or simple coform morphologies could be used to control the morphologies of the more complex coforms.

In the procedure used to produce the more complex coforms, slurries containing the tetravalent hydrous oxides, preferably coprecipitated, and PbO or Pb(OH)$_2$ and/or Ca(OH)$_2$ were heated to 200° C. Thereafter, the slurries were cooled to a specified temperature, here called the synthesis temperature, and preheated Ba(OH)$_2$ solution at a temperature between 70° C. and 110° C., containing a Sr/Ba mole ratio of about 0.01, was introduced into the slurry in specified time interval. After holding at temperature for about 20 to 30 minutes the slurry temperature was raised to a final temperature of 200° to 250° C. The exact final temperature selected will depend on coform composition, time, Ba(II) concentration in the aqueous phase and, probably, coform primary particle size. For complex coforms which are almost stoichiometric, that is, for products where the value of the ratio X(II)/Y(IV) is close to unity, fairly substantial changes in these parameters are required to effect a small change in the value of the ratio. For example, for coforms with primary particle sizes in the range of 0.1 to 0.2 micron and Ba(II) concentrations of 3 to 10 g/L an increase in the final treatment temperature from 200° to 250° C. over a period of about 30 minutes increased the value of X(II)/Y(IV) by about 0.02 units. Accordingly, the selection of the final treatment temperature can be quickly established by means of a few experiments.

Several complex coforms were synthesized. In Table XIV is listed the molar quantities of the reactants employed for each coform, the initial slurry volume, $V_i$, the total slurry volume after Ba(OH)$_2$ addition $V_f$, the synthesis temperature employed, the Ba(OH)$_2$ addition time, the final treatment temperature used (not necessarily the optimum final temperature), the X(II)/Y(IV) mole ratio in the solid phase, product area and, from TEM data, an estimate of coform primary particle size, size distribution and dispersibility. Because the BA(OH)$_2$ employed contained Sr and since Sr(II) is more readily incorporated in the coform than Ba(II), the SR(II) in the coform represents about 1 to 1.5 mole percent of the divalent cation content of the coform. For simplicity, this Sr is included in the Ba mole fraction in the coform.

As shown by the X(II)/Y(IV) mole rations in Table XIV, the coforms are either stoichiometric (within the precision of the analytical data) or very nearly stoichiometric. Further, apart from the product of Example XXXI, all products have primary particle sizes in the range of 0.05 to 0.2 micron, size distributions which are narrow or moderately narrow and appear to be dispersible. The product of Example XXXI is polydisperse. Its polydispersity is attributed to the combination of high synthesis temperature and the relatively prolonged Ba(OH)$_2$ addition time of 2.9 minutes. When the Ba(OH)$_2$ addition time is reduced to 0.2 minutes at 200° C., as in Example XXX, a product with a moderately narrow size distribution is obtained. Because of the sensitivity of product primary particle size distribution to Ba(OH)$_2$ addition times at 200° C., a lower synthesis temperature is preferred.

The nominal product formula of the Examples of Table XIV are presented in Table XV. It is apparent that the number of coforms with differing compositions that can be prepared is large.

TABLE XIV

| | Reactants and Conditions Employed in Syntheses of Complex Coforms | | | | | | | | |
|---|---|---|---|---|---|---|---|---|---|
| Example | XXX | XXXI | XXXII | XXXIII | XXXIV | XXXV | XXXVI | XXXVII | XXXVIII |
| $TiO_2$, moles | 0.1773 | 0.1773 | 0.1770 | 0.1770 | 0.1773 | 0.1773 | 0.1772 | 0.1772 | 0.166 |
| $ZrO_2$, moles | 0.0227 | 0.0227 | 0.0227 | 0.0227 | 0.0227 | 0.0227 | 0.0228 | 0.0228 | 0.020 |
| $SnO_2$, moles | 0.0000 | 0.0000 | 0.0000 | 0.0000 | 0.0000 | 0.0000 | 0.0000 | 0.0000 | 0.014 |
| $Pb(OH)_2$, moles | 0.0227 | 0.0227 | 0.0228 | 0.0000 | 0.0000 | 0.0000 | 0.0000 | 0.0000 | 0.000 |
| PbO, moles | 0.0000 | 0.0000 | 0.0000 | 0.0227 | 0.0265 | 0.0275 | 0.0000 | 0.0000 | 0.022 |
| $Ca(OH)_2$, moles | 0.0000 | 0.0000 | 0.0000 | 0.0000 | 0.0000 | 0.0000 | 0.0289 | 0.0289 | 0.022 |
| $V_i$, L | 0.69 | 0.69 | 0.69 | 0.69 | 0.69 | 0.69 | 0.64 | 0.64 | 0.64 |
| $Ba(OH)_2$, moles | 0.22 | 0.22 | 0.22 | 0.22 | 0.22 | 0.22 | 0.22 | 0.26 | 0.22 |
| $Sr(OH)_2$ moles | 0.002 | 0.002 | 0.002 | 0.002 | 0.002 | 0.002 | 0.002 | 0.003 | 0.02 |
| $Ba(OH)_2$ time, min | 0.2 | 2.9 | 3.1 | 3.0 | 3.1 | 0.2 | 3.2 | 3.0 | 3.2 |
| $V_f$, L | 1.10 | 1.10 | 1.10 | 1.10 | 1.10 | 1.10 | 1.10 | 1.10 | 1.01 |
| Synthesis Temp. °C. | 200 | 200 | 150 | 150 | 150 | 150 | 120 | 120 | 120 |
| Final Temp. °C. | 250 | 200 | 200 | 250 | 225 | 225 | 200 | 200 | 200 |
| Ba(II), g/L | ND | 5.4 | 7.2 | 6.7 | 5.0 | ND | 5.9 | 11.0 | 6.6 |
| X(II)/Y(IV) | 1.005 | 0.975 | 1.023 | 0.998 | 0.999 | 1.022 | 0.979 | 1.004 | 1.028 |
| Area $m^2$/g | 13.8 | 14.3 | 8.5 | 8.0 | ND | 12.1 | 14.6 | 12.2 | 9.8 |
| Size, microns | 0.05 | ND | 0.13 | 0.14 | ND | 0.06 | 0.2 | 0.2 | 0.2 |
| Distribution | mn | P | mn | mn | ND | mn | n | n | n |
| Dispersibility | d | ND | d | d | ND | d | d | d | d |

A TEM of the product of Example XXXVIII, the most complex coform synthesized, shows the presence of mostly single, fairly spherical primary particles although a few firmly bound doublets and triplets are also present. Other than for the difference in the sizes of the primary particles, the morphologies of $BaTiO_3$ and the complex coforms are similar.

TABLE XV

| Nominal Formulae of Complex Coforms | |
|---|---|
| Example No. | Nominal Formula |
| XXX | $Ba_{0.903}Pb_{0.102}Ti_{0.884}Zr_{0.116}O_3$ |
| XXXI | $Ba_{0.869}Pb_{0.106}Ti_{0.894}Zr_{0.106}O_3$ |
| XXXII | $Ba_{0.915}Pb_{0.108}Ti_{0.894}Zr_{0.116}O_3$ |
| XXXIII | $Ba_{0.908}Pb_{0.090}Ti_{0.094}Zr_{0.096}O_3$ |
| XXXIV | $Ba_{0.890}Pb_{0.109}Ti_{0.925}Zr_{0.075}O_3$ |
| XXXVI | $Ba_{0.859}Ca_{0.121}Ti_{0.862}Zr_{0.138}O_3$ |
| XXXVII | $Ba_{0.881}Ca_{0.123}Ti_{0.881}Zr_{0.119}O_3$ |
| XXXVIII | $Ba_{0.856}Pb_{0.097}Ca_{0.074}Ti_{0.830}Zr_{0.099}Sn_{0.071}O_3$ |

Quantitative product primary particle size and size distribution by TEM and by sedimentation were obtained for three of the products in Table XIV. The results obtained are summarized in Table XVI. In the cases of Examples XXXVII and XXXVIII, the quantitative data are in good agreement with the estimated size, size distribution and dispersibility data presented in Table XIV. In the case of the product of Example XXXIII product dispersibility, as defined here and as assessed by the sedimentation QR value, is, at best, only moderately dispersible. Nevertheless, the sedimentation data indicates that less than 5 weight percent of the material is present as aggregates having a size greater than 1 micron.

TABLE XVI

| | Size and Size Distribution of Complex Coforms | | | |
|---|---|---|---|---|
| Example | Image Analysis | | Sedimentation | |
| No. | Size (microns) | QR | Size (microns) | QR |
| XXXIII | 0.12 | 1.33 | 0.24 | 2.2 |
| XXXVII | 0.19 | 1.31 | 0.24 | 1.6 |
| XXXVIII | 0.18 | 1.25 | 0.20 | 1.5 |

The dispersibility of the product of Example XXXV (Table XIV) was also studied. With this sample it was found that less than 10 weight percent of the sample had a size greater than 0.25 micron and over 65 weight percent of the sample was less than 0.1 micron in size. These results demonstrate that coforms with TEM primary particle size of about 0.06 micron can also be dispersed.

Examples XXXIX-XLII; Cobalt(II) and/or Niobium(V) Doped Barium Titanate

A series of cobalt(II) and niobium(V) doped barium titanate products were prepared. A stock 1M cobalt acetate solution was used as the cobalt source. A hydrous niobium oxide wet cake which, on drying, had a nitrogen surface area of about 220 $m^2$/g was used as the source of niobium(V). Doping was accomplished by addition of the requisite amounts of the cobalt solution and/or the hydrous niobium oxide wet cake to 0.2 moles of hydrous titania. The resulting slurry volumes were adjusted to 0.64 liters and then treated in an analogous manner to that used in the synthesis of the barium titanate of Example V. After synthesis, the resulting slurries were filtered and the filtrates and solid samples were characterized. Negligible amounts of titanium, niobium and cobalt were found in the filtrates. In the case of Example XLII, the filter cake was washed with carbon dioxide free water prior to determination of its composition. The amounts of the dopants employed in each example together with the analytical results obtained are summarized in Table XVII.

The results in the table indicate that, when Co(II) is the dopant (Example XXXIX), the product of the reaction has a Ba(II)/Ti(IV) mole ratio of unity indicating that the product consists of a stoichiometric barium titanate containing Co(II) probably present as CoO. On the other hand, as shown by the product of Example XL, when Nb(V) is used as the dopant, the Ba(II)/Ti(IV) mole ratio in the product substantially exceeds unity indicating that Ba(II) also reacts with Nb(V). When both Nb(V) and Co(II) are employed as dopants, as in Example XLI, the Ba(II)/Ti(IV) again exceeds unity. Finally, in the washed product of Example XLII, the Ba(II)/Ti(IV) ratio, within the precision of the data, is unity although the sample contains Nb(V). In this example, it is likely that washing reduced the Ba(II) content of the product.

TABLE XVII

Dopants Employed and Compositions of Slurry Samples

| Example No. | Dopant - Moles Co(II) | Dopant - Moles Nb(V) | Ba(II)[a] g/L | Cation Mole Ratio in Solids Ba:Ti:Nb:Co |
|---|---|---|---|---|
| XXXIX | 0.0200 | 0.0000 | 7.8 | 0.992:1.000:0.000:0.090 |
| XL | 0.0000 | 0.0200 | 3.9 | 1.094:1.000:0.085:0.000 |
| XLI | 0.0200 | 0.0200 | 3.4 | 1.051:1.000:0.089:0.088 |
| XLII | 0.0014 | 0.0040 | ND | 1.005:1.000:0.024:0.007 |

[a] Ba(II) in filtrate.

The morphological characteristics of the solid products are summarized in Table XVIII. Although the products of Examples XXXIX, XL and XLI containing high dopant levels appear to be dispersible and have narrow size distributions, the micrographs show that product primary particle size and, to some extent shape at least when Co(II) is one of the dopants, are different from that depicted in FIG. 1. On the other hand, the morphology of the product of Example XLII, containing less than 5 mole percent dopant, is comparable with that of the product of FIG. 1.

TABLE XVIII

Morphologies of Co(II) and/or Nb(V) Doped Barium Titanates

| Example No. | Image Analysis Size μm | Image Analysis QR | Image Analysis Dispersibility | $N_2$ Area $m^2/g$ |
|---|---|---|---|---|
| XXXIX | 0.09 | n | d | 14.0 |
| XL | 0.12 | n | (a) | 13.6 |
| XLI | 0.10 | n | d | 17.4 |
| XLII | 0.13 | n | d | 11.3 |

(a) some aggregation

Examples XLIII and XLIV; Manganese Doped Barium Titanate

Experiments were conducted to determine the effect of manganese doping of barium titanate on product morphology and composition. The manganese dopant was introduced by addition of an aliquot of a Mn(II) salt solution to hydrous titania. The synthesis conditions employed were similar to those described in Examples XXXIX to XLII. It was found for a product containing 10 mole percent Mn, the Ba/Ti mole ratio in the product, 0.997, was close to unity. This means that, like Co(II), manganese does not combine with either Ba(II) or Ti(IV) during the synthesis process. TEM data indicated that even at this high manganese dopant level a dispersible product having a median primary particle size of about 0.1 micron and a narrow size distribution is obtained. Product surface area was 12.1 $m^2/g$. Apparently, manganese doping, even at high levels, has only a small effect on product morphology. At low dopant levels, product morphology was comparable with that shown in FIG. 1.

In order to demonstrate that the Ba(II) content of Mn doped $BaTIO_3$ can be increased, two Mn doped $BaTiO_3$ products were synthesized. After the synthesis process was completed, an aliquot of a solution of ammonium carbonate containing the equivalent number of moles of carbonate as dopant was added to the slurry. Thereafter, the slurry was sampled and the solid phase was characterized. The dopant levels used and the product composition found are presented in Table XIX. The results demonstrate that addition of ammonium carbonate is effective in increasing the Ba(II) content of the product so that products with Ba/(Ti+Mn) mole ratio which are substantially unity can be produced.

TABLE XIX

Effect of Ammonium Carbonate Addition on Ba(II) Content of Manganese Doped Barium Titanate

| Example No. | Mn(II) Added* moles | Cation Mole Ratio in Solids Ba:Ti:Mn | Ba/(Mn + Ti) mole ratio |
|---|---|---|---|
| XLIII | 0.002 | 1.010:1.000:0.009 | 1.001 |
| XLIV | 0.004 | 1.032:1.000:0.018 | 1.014 |

*Added to 0.2 moles hydrous titania

The present examples show that the hydrothermal synthesis process of this invention can be used to dope barium titanate with a large variety of dopants without substantially affecting product morphology. Further, it is apparent that the procedures employed to dope barium titanate can be readily extended to doping coforms.

It is understood that the preceeding description is given merely by way of illustration and not in limitation of the invention and that various modifications may be made thereto without departing from the spirit of the invention as claimed.

We claim:
1. A method for producing submicron, dispersible perovskite based products having substantially the formula:

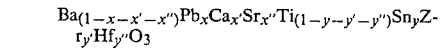

$$Ba_{(1-x-x'-x'')}Pb_xCa_{x'}Sr_{x''}Ti_{(1-y-y'-y'')}Sn_yZr_{y'}Hf_{y''}O_3$$

where the mole fractions x, x', x'', y, y', and y'' each have independent values ranging from 0 to 0.3, and the sum of either (x+x'+x'') or (y+y'+y'') does not exceed 0.4, comprising:
  (a) Heating an agitated aqueous slurry containing x moles of PbO or Pb(OH)$_2$, x' moles of CaO or Ca(OH)$_2$, (1−y−y'−y'') moles of hydrous TiO$_2$, y moles of hydrous SnO$_2$, y' moles of hydrous ZrO$_2$ and y'' moles of hydrous HfO$_2$ to a temperature in the range of from about 100° to 200° C.,
  (b) Adjusting the temperature of the aqueous agitated slurry to a temperature in the range between 50° and 200° C.,
  (c) Adding to the agitated slurry of solution, having a temperature between 70° and 110° C., containing x'' moles of Sr(OH)$_2$ and up to a 20% excess of the stoichiometric requirement, (1−x−x'−x''), of Ba(OH)$_2$ over a period from about 0.1 to about 5 minutes,
  (d) Holding the agitated slurry at the temperature used in step (b) for a period of 10 to 30 minutes,
  (e) Heating the agitated slurry to a temperature not exceeding 225° C. to ensure formation of a stoichiometric perovskite product,
  (f) Cooling the slurry and separating the perovskite product.

2. A method as defined in claim 1 wherein at least one dopant is added in step (a) in an amount such that the molar ratio of dopant to the sum of TiO$_2$, SnO$_2$, ZrO$_2$ and HfO$_2$ is less than 0.05.

3. A method as defined in claim 2 wherein the dopant is selected from the group consisting of Nb, La, Y, Ni, Mn, Fe, Co and mixtures thereof.

4. A method as defined in claim 2 wherein the dopant is selected from the group consisting of Mb, Co, Mn and mixtures thereof.

5. A method as defined in claim 1 or 2 wherein the sum of the moles of the tetravalent hydrous oxides per liter in the slurry in step (a) ranges from 0.14 to 0.7.

6. A method as defined in claim 1 or 2 wherein the separated solid perovskite product in step (f) is washed with 0.005 to 0.02M $Ba(OH)_2$ solution.

7. A method as defined in claim 1 wherein the hydrous $TiO_2$, $SnO_2$, $ZrO_2$, and $HfO_2$ used in step (a) are coprecipitated.

8. A method as defined in claim 2 wherein the hydrous $TiO_2$, $SnO_2$, $ZrO_2$, $HfO_2$ and the dopant or dopants used in step (a) are coprecipitated.

9. A method as defined in claim 1 or 2 wherein the temperature of the agitated slurry in step (b) is adjusted to between 60° and 150° C.

10. A process of claim 2 wherein the dopant is added in step (a) as aqueous solutions of nitrates, formates, acetates, and/or mixtures thereof.

* * * * *

UNITED STATES PATENT AND TRADEMARK OFFICE
CERTIFICATE OF CORRECTION

PATENT NO. : 4,832,939

DATED : May 23, 1989

INVENTOR(S): Menashi et al.

It is hereby certified that error appears in the above-identified patent and that said Letters Patent is hereby corrected as shown below:

Col. 1, Line 45, "C.," should read --C,--.

Col. 1, Line 48, "5°C. and 130°C.," should read --5°C and 130°C,--.

Col. 1, Line 49, "-90°C. and 5°C." should read ---90°C and 5°C--.

Col. 1, line 52, "temperature" should read --temperatures--

Col. 1, line 61, "temeratures" should read --temperatures--

Col. 2, line 20, "1200°C.," should read --1200°C,--.

Col. 2, line 63, "BaTiO3" should read --$BaTiO_3$--.

Col. 3, line 4, "800°C." should read --800°C--.

Col. 3, line 54, "TiO2" should read --$TiO_2$--.

Col. 3, line 55, "200°C." should read --200°C--.

Col. 3, line 56, "400°C." should read --400°C--.

Col. 4, line 2, "300°C." should read --300°C--.

Col. 4, line 13, "110°C." should read --110°C--.

Col. 4, line 26, "200°C." should read --200°C--.

Col. 4, line 63, "110°C.," should read --110°C,--.

Col. 4, line 64, "90°C.," should read --90°C,--.

UNITED STATES PATENT AND TRADEMARK OFFICE
CERTIFICATE OF CORRECTION

PATENT NO. : 4,832,939

DATED : May 23, 1989

INVENTOR(S): Menashi et al.

It is hereby certified that error appears in the above-identified patent and that said Letters Patent is hereby corrected as shown below:

Col. 4, line 66, "60°C. and 150°C." should read --60°C and 150°C--.

Col. 5, line 5, "175°C.," should read --175°C,--.

Col. 5, line 39, "200°C.," should read --200°C,--.

Col. 5, line 47, "C. and 150°C." should read --C and 150°C

Col. 6, line 66, " The powder" should read --This powder--

Col. 7, line 39, "200°C." should read --200°C--.

Col. 8, line 5, "120°C.," should read --120°C,--.

Col. 8, line 13, "200°C." should read --200°C--.

Col. 8, line 15, "60°C." should read --60°C--.

Col. 8, line 35, "70°C. and 110°C.," should read --70°C and 110°C,--

Col. 8, line 57, "225°C.," should read --225°C,--.

Col. 9, line 1, "200°C.." should read --200°C.--.

Col. 9, line 25, "200°C.." should read --200°C.--.

Col. 9, line 35, "200°C." should read --200°C--.

Col. 9, line 36, "150°C." should read --150°C--.

UNITED STATES PATENT AND TRADEMARK OFFICE
CERTIFICATE OF CORRECTION

PATENT NO. : 4,832,939

DATED : May 23, 1989

INVENTOR(S): Menashi et al.

It is hereby certified that error appears in the above-identified patent and that said Letters Patent is hereby corrected as shown below:

Col. 9, line 51, "Ba(OH)2" should read --Ba(OH)$_2$--.

Col. 10, line 8, "OH-$^-$" should read --OH$^-$--.

Col. 10, line 64, "know" should read --known--.

Col. 12, line 23, "Produce" should read --Product--.

Col. 12, line 39, "100°C.," should read --100°C,--.

Col. 12, line 41, "800°C." should read --800°C--.

Col. 12, line 50, "determened" should read --determined--.

Col. 12, line 52, "110°C.," should read --110°C,--.

Col. 13, line 33, "150°C." should read --150°C--.

Col. 13, line 36, "200°C." should read --200°C--.

Col. 13, line 39, "200°C.," should read --200°C,--.

Col. 13, line 42, "110°C." should read --110°C--.

Col. 14, line 48, "1200°C" should read --120°C--.

Col. 17, line 21, "summarize" should read --summarized--.

Col. 18, line 10, "C." should read --C--.

Col. 18, line 27, "80°C." should read --80°C--.

UNITED STATES PATENT AND TRADEMARK OFFICE
CERTIFICATE OF CORRECTION

PATENT NO. : 4,832,939

DATED : May 23, 1989

INVENTOR(S): Menashi et al.

It is hereby certified that error appears in the above-identified patent and that said Letters Patent is hereby corrected as shown below:

Col. 18, line 28, "120°C.," should read --120°C,--.

Col. 18, line 30, "150°C." should read --150°C--.

Col. 18, line 47, "200°C." should read --200°C--.

Col. 18, line 51, "150°C.," should read --150°C,--.

Col. 18, line 55, "150°C." should read --150°C--.

Col. 18, line 68, "120°C." should read --120°C--.

Col. 19, line 3, "120°C." should read --120°C--.

Col. 19, line 5, "150°C.," should read --150°C,--.

Col. 19, line 7, "200°C., sampled, held at 200°C." should read --200°C, sampled, held at 200°C--.

Col. 19, line 30, "200°C." should read --200°C--.

Col. 19, line 45, "120°C." should read --120°C--.

Col. 19, line 55, "200°C.," should read --200°C,--.

Col. 19, line 67, "(Example XXIII)" should read --(Example XXIII).--.

Col. 19, line 68, "150°C." should read --150°C--.

Col. 20, line 1, "200°C." should read --200°C--.

Col. 20, line 2, "150°C." should read --150°C--.

UNITED STATES PATENT AND TRADEMARK OFFICE
CERTIFICATE OF CORRECTION

PATENT NO. : 4,832,939

DATED : May 23, 1989

INVENTOR(S): Menashi et al.

It is hereby certified that error appears in the above-identified patent and that said Letters Patent is hereby corrected as shown below:

Col. 20, line 31, "contianed" should read --contained--.

Col. 20, line 50, "160°C." should read --160°C--.

Col. 20, line 56, "200°C." should read --200°C--.

Col. 20, line 67, "191°C." should read --191°C--.

Col. 20, line 68, "200°C." should read --200°C--.

Col. 21, line 9, "200°°C." should read --200°C.--.

Col. 21, line 10, "200°C." should read --200°C--.

Col. 21, line 38, "C." should read --C--.

col. 21, line 39, "150°C.," should read --150°C--

Col. 21, line 59, "150°C." should read --150°C--.

Col. 21, line 61, "250°C." should read --250°C--.

Col. 22, line 10, "200°C." should read --200°C--.

Col. 22, line 13, "200°C." should read --200°C--.

Col. 22, line 15, "0.06 L" should read --0.1 L--.

Col. 23, line 13, "150°C." should read --150°C--.

Col. 23, line 15, "C." should read --C--.

**UNITED STATES PATENT AND TRADEMARK OFFICE
CERTIFICATE OF CORRECTION**

PATENT NO. : 4,832,939

DATED : May 23, 1989

INVENTOR(S): Menashi et al.

It is hereby certified that error appears in the above-identified patent and that said Letters Patent is hereby corrected as shown below:

Col. 23, line 16, "200°C." should read --200°C--.

Col. 23, line 42, "Moreoever" should read --Moreover--.

Col. 24, line 1, "70°C." should read --70°C--.

Col. 24, line 2, "110°C.," should read --110°C,--.

Col. 24, line 17, "250°C." should read --250°C--.

Col. 24, line 41-42, "BA(OH)$_2$" should read --Ba(OH)$_2$--.

Col. 24, line 48, "rations" should read --ratios--.

Col. 24, line 59, "200°C.," should read --200°C,--.

Col. 24, line 63, "200°C.," should read --200°C,--.

Col. 27, line 59, "BaTIO$_3$" should read --BaTiO$_3$--.

Col. 28, line 42, in Claim 1, "200°C.," should read --200°C,--.

Col. 28, line 45, in Claim 1, "200°C.," should read --200°C,--.

Col. 28, line 46, in Claim 1, "of solution," should read -- a solution,--.

Col. 28, line 47, in Claim 1, "110°C.," should read --110°C,--.

UNITED STATES PATENT AND TRADEMARK OFFICE
CERTIFICATE OF CORRECTION

PATENT NO. : 4,832,939

DATED : May 23, 1989

INVENTOR(S) : Menashi et al

It is certified that error appears in the above-identified patent and that said Letters Patent is hereby corrected as shown below:

Col. 28, line 55, in Claim 1, "225°C." should read --225°C--.

Col. 28, line 67, in Claim 4, "Mb," should read --Nb,--.

Signed and Sealed this

Thirty-first Day of December, 1991

Attest:

HARRY F. MANBECK, JR.

*Attesting Officer*    *Commissioner of Patents and Trademarks*